United States Patent
Hasuda et al.

(10) Patent No.: US 9,199,526 B2
(45) Date of Patent: Dec. 1, 2015

(54) VEHICLE AND VEHICLE DRIVING DEVICE

(71) Applicant: JTEKT CORPORATION, Osaka-shi, Osaka (JP)

(72) Inventors: Yasuhiko Hasuda, Kashihara (JP); Masanori Arima, Nara (JP); Ken Matsubara, Matsubara (JP); Hideki Higashira, Ikoma (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/186,208

(22) Filed: Feb. 21, 2014

(65) Prior Publication Data

US 2014/0238766 A1    Aug. 28, 2014

(30) Foreign Application Priority Data

Feb. 26, 2013  (JP) ................. 2013-036116
Apr. 10, 2013  (JP) ................. 2013-082325

(51) Int. Cl.
*B60K 17/356*  (2006.01)
*B60K 1/02*  (2006.01)
*B60K 23/08*  (2006.01)
*B60L 15/20*  (2006.01)
*B60K 17/35*  (2006.01)

(52) U.S. Cl.
CPC ............. *B60K 1/02* (2013.01); *B60K 23/0808* (2013.01); *B60L 15/20* (2013.01); *B60L 15/2036* (2013.01); *B60L 15/2045* (2013.01); *B60L 15/2054* (2013.01); *B60K 17/3505* (2013.01); *B60K 17/356* (2013.01); *B60L 2220/44* (2013.01); *B60L 2220/46* (2013.01); *B60L 2260/28* (2013.01); *Y02T 10/648* (2013.01); *Y02T 10/7283* (2013.01)

(58) Field of Classification Search
CPC ........... B60K 23/0808; B60K 17/3505; B60K 17/356; B60K 7/007
USPC ................. 180/242, 243, 248, 6.5, 65.1, 65.6
See application file for complete search history.

(56) References Cited

U.S. PATENT DOCUMENTS

| | | | |
|---|---|---|---|
| 4,962,821 A * | 10/1990 | Kim | 180/6.48 |
| 2007/0084646 A1* | 4/2007 | Scruggs | 180/6.2 |
| 2008/0230284 A1* | 9/2008 | Schoon | 180/6.5 |
| 2010/0332094 A1* | 12/2010 | Wu et al. | 701/69 |
| 2012/0118652 A1* | 5/2012 | Yamamoto et al. | 180/65.6 |
| 2013/0289810 A1* | 10/2013 | Holmes et al. | 701/22 |
| 2014/0243149 A1* | 8/2014 | Holmes et al. | 477/5 |
| 2014/0332301 A1* | 11/2014 | Knoblauch et al. | 180/248 |

FOREIGN PATENT DOCUMENTS

JP    A-2011-188557    9/2011

* cited by examiner

*Primary Examiner* — Joseph Rocca
*Assistant Examiner* — Marlon Arce
(74) *Attorney, Agent, or Firm* — Oliff PLC

(57) ABSTRACT

A vehicle includes: a pair of front wheels; a pair of rear wheels; a front-wheel motor configured to drive the front wheels; a rear-wheel motor configured to drive the rear wheels; and a reducer configured to reduce a rotation speed of one of the front-wheel motor and the rear-wheel motor, and transmit drive power to the wheels driven by one of the motors. The one of the front-wheel motor and the rear-wheel motor is a motor with a rotation speed higher and torque lower than those of the other one of the motors.

10 Claims, 10 Drawing Sheets

F I G . 8
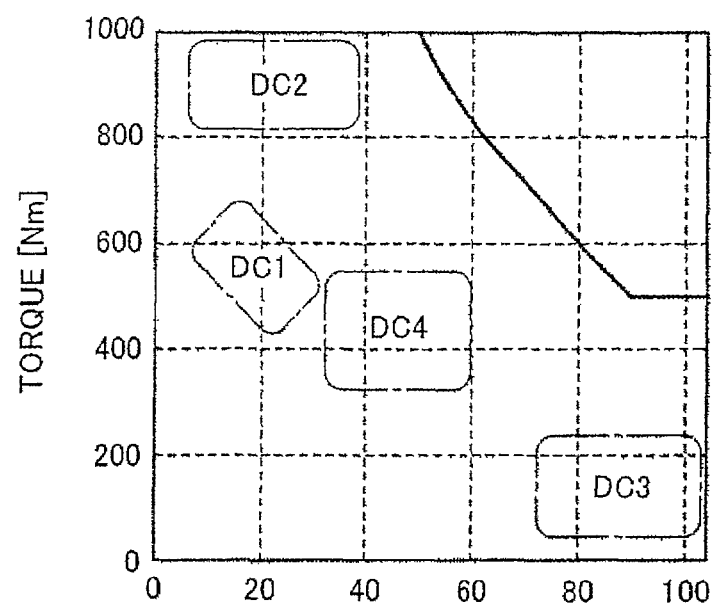

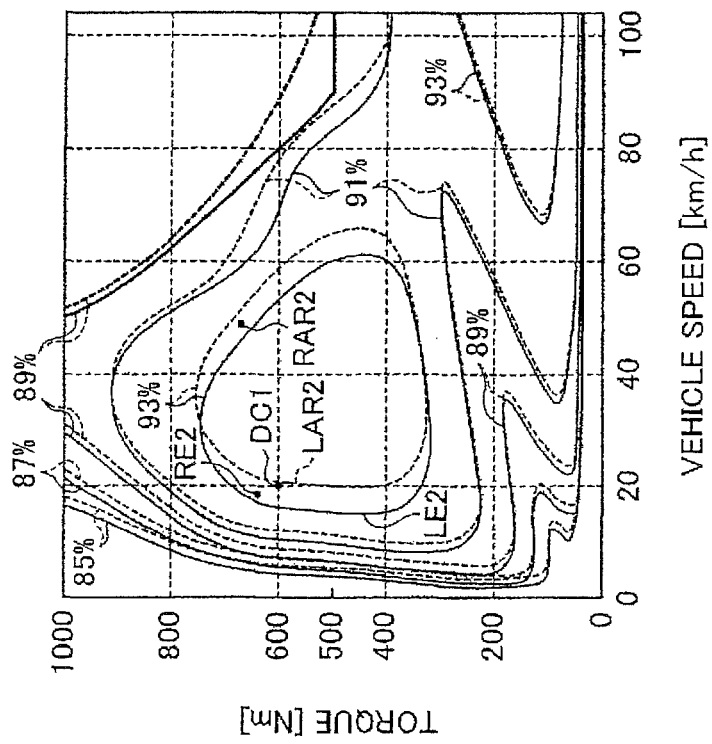
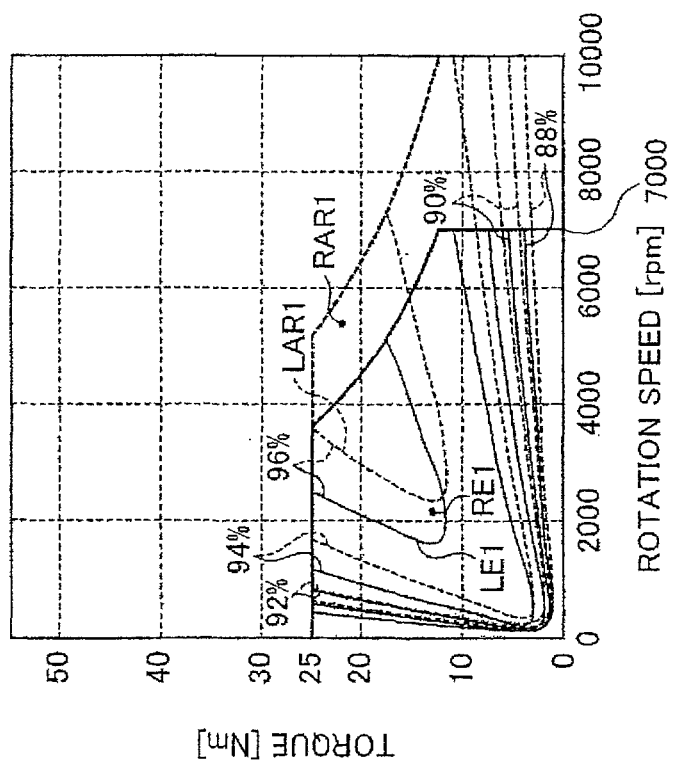
FIG. 10A
FIG. 10B

VEHICLE AND VEHICLE DRIVING DEVICE

INCORPORATION BY REFERENCE

The disclosure of Japanese Patent Application Nos. 2013-036116 and 2013-082325 filed on Feb. 26, 2013 and Apr. 10, 2013 including the specification, drawings and abstract is incorporated herein by reference in its entirety.

BACKGROUND OF THE INVENTION

1. Field of the Invention

The invention relates to a vehicle in which wheels are driven by motors, such as an electric automobile.

The invention also relates to a vehicle driving device provided with drive motors that drive first wheels and second wheels, respectively, and to an electric vehicle equipped with the vehicle driving device.

2. Description of Related Art

Electric vehicles using an in-wheel motor system in which a motor driving a wheel is disposed inside the wheel have been disclosed. Among them, there are electric vehicles using a direct drive system by which a wheel is driven by a motor directly connected to the wheel (see, for example, Japanese Patent Application Publication No. 2011-188557 (JP 2011-188557 A)).

In such an electric vehicle, a torque necessary when the vehicle is driven is distributed to front-wheel motors driving the front wheels and rear-wheel motors driving the rear wheels in order to minimize the total power consumed by all of the motors. Thus, in the electric vehicle, the torque that can be efficiently outputted by the front-wheel motors is combined with the torque that can be efficiently outputted by the rear-wheel motors to output the torque necessary when the vehicle is driven.

A vehicle driving device has a configuration in which two first drive motors that drive a pair of respective first wheels and two second drive motors that drive a pair of respective second wheels are contained in respective first wheels and second wheels. The vehicle driving device distributes the torque when the electric vehicle is driven to the first drive motors and second drive motors so that the total power consumed by all of the drive motors is minimized. Thus, the vehicle driving device combines the torque at which the individual efficiency of the first drive motor is increased and the torque at which the individual efficiency of the second drive motor is increased to output the torque necessary when the electric vehicle is driven. JP 2011-188557 A shows an example of such a vehicle driving device.

SUMMARY OF THE INVENTION

However, since the electric vehicle disclosed in JP 2011-188557 A uses the direct drive system, the front-wheel motors and rear-wheel motors are required to output torques that make it possible to run the vehicle at a rotation speed corresponding to the actual running speed of the vehicle. In other words, the front-wheel motors and rear-wheel motors have practically identical rotation speed characteristics and torque characteristics required therefrom. Accordingly, in the abovementioned electric vehicle, high-efficiency regions in the front-wheel motors and rear-wheel motors are positioned in relatively close rotation speed regions (wheel speed regions) and torque regions.

Therefore, it is possible that at a certain speed of the running vehicle, the required torque could not be outputted with the torque that can be efficiently outputted by the front-wheel motors and rear-wheel motors. Thus, a problem associated with the abovementioned electric vehicles is that driving conditions at which the total efficiency of the power system can be increased are restricted to a narrow range.

This problem is generally common to vehicles in which a plurality of wheels are driven by a plurality of motors. The invention provides a vehicle in which the total efficiency of the power system that drives the wheels can be increased.

In the vehicle driving device described in JP 2011-188557 A, the region with a high individual efficiency of the first drive motor and the region with a high individual efficiency of the second drive motor both shift to a high-rotation region. Therefore, for example, in a low-rotation region of the wheel rotation speed of the wheels, for example, as in the case where the electric vehicle is repeatedly stopped and started during traffic congestion, the total efficiency of all of the drive motors decreases. As a result, the total efficiency of the drive system also decreases in the low-rotation region. The total efficiency of the power system is calculated as a value obtained by dividing the drive power transmitted to the first wheels and second wheels by the power consumed by the batteries of the drive motors. The drive force transmitted to the first wheels and second wheels is calculated on the basis of the torque of the first drive motors and second drive motors. Therefore, the total efficiency of the power system behaves similarly to the total efficiency of all of the drive motors.

The invention also provides a vehicle driving device that can inhibit the decrease in the total efficiency of the power system in a low-rotation region and an electric vehicle equipped with the vehicle driving device.

The means of the invention and the operation effects thereof are described below. According to a first aspect of the invention, a vehicle includes a pair of front wheels; a pair of rear wheels; a front-wheel motor configured to drive the front wheels; a rear-wheel motor configured to drive the rear wheels; and a reducer configured to reduce a rotation speed of one of the front-wheel motor and the rear-wheel motor and transmit drive power to the wheels driven by the one motor, wherein one of the front-wheel motor and the rear-wheel motor is a motor with a rotation speed higher and torque lower than those of the other one of the motors.

According to the abovementioned aspect, one of the front-wheel motor and the rear-wheel motor is a motor with a rotation speed higher and torque lower than those of the other one of the motors. Further, the other one the motors is a motor with a rotation speed lower and a torque higher than those of the one of the motors. Thus, in the one of the motors, the loss (iron loss) in the high-rotation region and low-torque region of the motor is large, and the loss (copper loss) in the low-rotation region and high-torque region of the motor is low. In the other one the motors, the loss (copper loss) in the low-rotation region and high-torque region of the motor is large, and the loss (iron loss) in the high-rotation region and low-torque region of the motor is low.

Therefore, the one of the motors and the other one of the motors have high-efficiency regions in mutually different rotation speed regions and torque regions. The one of the motors has an efficiency characteristic such that even after the reduction with the reducer, the loss in the high-rotation region and low-torque region is higher and the loss in the low-rotation region and high-torque region is lower than those in the other one the motors.

Thus, the one of the motors subjected to reduction with the reducer is easy to provide with a difference in the efficiency characteristic related to rotation speed and torque as compared with the other one the motors that is not subjected to reduction with the reducer. For this reason, torque distribution that increases the total efficiency of the power system can be performed in a rotation speed region and a torque region that are wider than those in the case where all of the wheels (front wheels and rear wheels) are directly driven by the motors. Therefore, in the vehicle of the abovementioned configuration, the total efficiency of the power system driving the wheels can be increased under various driving conditions.

The expression "one of the motors has a rotation speed higher and a torque lower than those of the other one the motors" means that the no-load rotation speed of the one of the motors is higher than the no-load rotation speed of the other one the motors, and the maximum torque of the one of the motors is lower than the maximum torque of the other one the motors.

In the vehicle according to the abovementioned aspect, a reduction ratio of the reducer may be set according to a value obtained by dividing a maximum torque of the other one the motors by a maximum torque of the one of the motors. With such a feature, the torque region that can be generated by the one of the motors reduced by the reducer can be prevented from diverging from the torque region that can be generated by the other one the motors. As a result, for example, it is possible to avoid the case in which the torque required for the vehicle can be generated only by the one of the motors reduced by the reducer or the other one the motors which is not reduced by the reducer.

The vehicle according to the abovementioned aspect may further include a clutch configured to allow or prohibit the transmission of drive power between the one of the motors and the wheels driven by the one of the motors. With such a configuration, where the drive power is distributed only to the other one the motors when the vehicle is driven, the clutch prohibits the transmission of drive power between the one of the motors and the wheels driven by the one of the motors. As a result, the loss generated when the drive power produced by the other one the motors rotates the one of the motors through the wheels driven by the one of the motors can be reduced.

The vehicle according to the abovementioned aspect may be by further provided on a front wheel side with a steering mechanism for changing a traveling direction, wherein the one motor is the front-wheel motor, and the other one the motors is the rear-wheel motor.

In general, when it is desired to increase the torque outputted by a motor, the motor body is radially enlarged to increase the number of windings of the motor. Thus, the body of the rear-wheel motor is enlarged to output a high torque, as compared with the front-wheel motor.

With the above-described configuration, the front wheels are driven by the front-wheel motor via the reducer. Meanwhile, the rear wheels are directly driven by the rear-wheel motor which is larger in body size than the front-wheel motor. Therefore, the vehicle can be provided with a wider empty space in the radial direction of the motor in the front wheel, as compared with the case in which the front wheels are driven by the rear-wheel motor. As a result, the degree of freedom in the arrangement of a steering mechanism when it is provided on the front wheel side can be increased.

According to the abovementioned aspect, the total efficiency of the power system driving the wheels can be increased.

According to a second aspect of the invention, a vehicle driving device includes: a first driving unit having a first drive motor driving first wheels; and a second driving unit having a second drive motor driving second wheels. The first drive motor is set such that an iron loss is larger than an iron loss of the second drive motor in a high-rotation region and a low-torque region of the first drive motor, and a copper loss is smaller than a copper loss of the second drive motor in a low-rotation region and a high-torque region of the first drive motor. The second drive motor is set such that a copper loss is larger than a copper loss of the first drive motor in a low-rotation region and a high-torque region of the second drive motor, and an iron loss is smaller than an iron loss of the first drive motor in a high-rotation region and a low-torque region of the second drive motor. An upper limit value of a wheel rotation speed of the first wheels driven by the first drive motor is less than an upper limit value of a wheel rotation speed of the second wheels driven by the second drive motor.

According to the abovementioned aspect, the motor efficiency increases in the low-rotation region and high-torque region of the first drive motor. Therefore, the motor efficiency increases in the low-rotation region, as compared with the conventional vehicle driving device. In addition, the upper limit value of the wheel rotation speed of the first wheels driven by the first drive motor is less than the upper limit value of the wheel rotation speed of the second wheels driven by the second drive motor. For this reason, in the present vehicle driving device, the motor efficiency in the lower-rotation region increases over than in the case in which the upper limit value of the wheel rotation speed of the first wheels driven by the first drive motor is assumed to be equal to the upper limit value of the wheel rotation speed of the second wheels driven by the second drive motor. Therefore, in the present vehicle driving device, the total power efficiency in the lower-rotation region is increased.

The vehicle driving device according to the abovementioned aspect may further include a reducer configured to transmit a torque of the first drive motor to the first wheels in a state in which a rotation speed of the first drive motor is reduced. Further, in this configuration, the first wheels may be front wheels, the second wheels may be rear wheels, and the vehicle driving device may further include a steering mechanism configured to change a steering angle of the front wheels.

The number of windings (number of turns) of a conductive wire in a drive motor is typically increased when the torque outputted by the drive motor is increased. In this case, a space is necessary for inserting the conductive wire into the slots of the stator core onto which the conductive wire is wound. Therefore, the stator core is enlarged in the radial direction of the drive motor. As a result, the drive motor is radially enlarged.

Meanwhile, since the reducer is connected to the first drive motor, when the maximum torque of the first drive motor after the reduction and the maximum torque of a virtual drive motor that is assumed to drive the first wheels (front wheels) directly are equal to each other, the individual maximum torque of the first drive motor becomes less than the maximum torque of the virtual drive motor. Therefore, the first drive motor is less in the body size than the virtual drive motor.

In the abovementioned configuration, since the first drive motor drives the front wheels, an empty space formed between the front wheels and the first drive motor can be made wider than in the configuration in which the virtual drive motor drives the front wheels. Therefore, when a steering mechanism is mounted on the front wheels, the degree of freedom in arranging the steering mechanism relative to the front wheels is increased.

In the vehicle driving device according to the abovementioned aspect, the first driving unit may be further provided with a clutch that switches between a connected state in which a torque of the first drive motor can be transmitted to the first wheels, and a disconnected state in which the torque of the first drive motor cannot be transmitted to the first wheels.

Further, in the abovementioned configuration, when only the second drive motor is driven, the clutch may be in the disconnected state. In such a configuration, when the torque necessary to drive the electric vehicle is distributed only to the second drive motor, the transmission of torque between the first wheels and the first drive motor is cut off by the clutch. As a result, the occurrence of loss caused by the rotation of the first drive motor through the first wheels by the torque generated by the second drive motor is inhibited.

In the above-described aspect, the electric vehicle may be equipped with the vehicle driving device.

With the vehicle driving device and electric vehicle according to the above-described aspects, the decrease in the total efficiency of the power system in a low-rotation region can be inhibited.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8 is a graph showing schematically the rotation speed region and torque region in the running state of the electric vehicle of the embodiment;

FIG. 10A is a graph showing the individual efficiency of the front-wheel drive motor, this graph relating to the vehicle driving device of the embodiment; and FIG. 10B is a graph showing the total efficiency of the power system, this graph relating to the vehicle driving device of the embodiment.

DETAILED DESCRIPTION OF EMBODIMENTS

Figure 1:
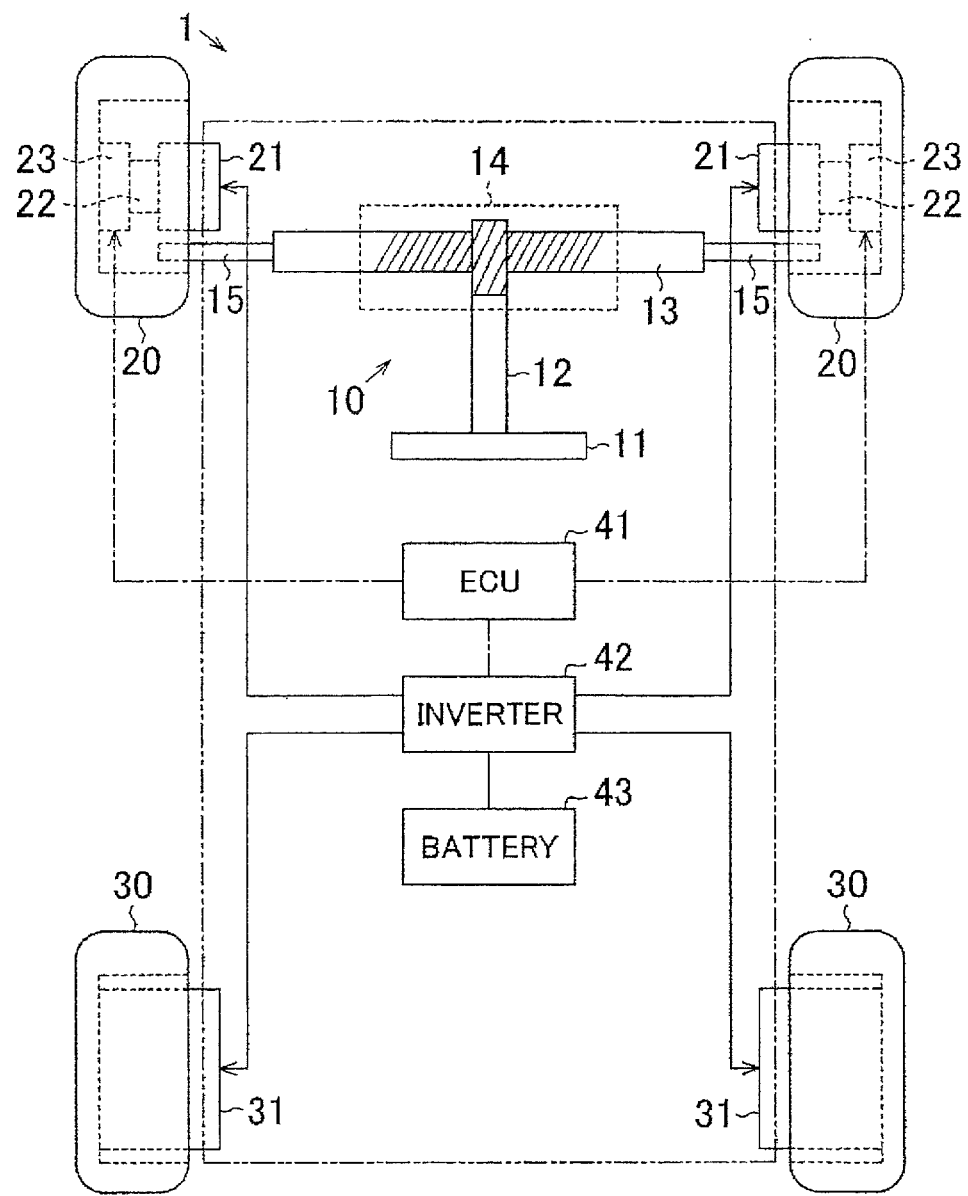
FIG. 1 is a schematic drawing illustrating the general configuration of the vehicle of an embodiment.

An embodiment of the invention will be explained hereinbelow with reference to the appended drawings. As shown in FIG. 1, a vehicle 1 is provided with a steering mechanism 10, a pair of left and right front wheels 20, a pair of left and right rear wheels 30, an ECU 41, an inverter 42, and a battery 43.

The steering mechanism 10 has a steering wheel 11, a steering shaft 12, a rack shaft 13, a rack-and-pinion mechanism 14, and two tie rods 15. In the steering mechanism 10, the steering shaft 12 rotates following the rotation of the steering wheel 11. The rotation of the steering shaft 12 is converted by the rack-and-pinion mechanism 14 into the reciprocating movement of the rack shaft 13, whereby the steering angle of the front wheels 20 is changed.

The front wheel 20 has a front-wheel motor 21, a reducer 22, and a clutch 23. The front-wheel motor 21 is, for example, an alternate current (AC) motor such as a synchronous motor. Further, the front-wheel motor 21 drives the front wheel 20 through the reducer 22 and the clutch 23. The reducer 22 reduces the rotation speed of the front-wheel motor 21 and transmits the reduced rotation speed to the front wheel 20. The rotation speed of the front wheel 20 is determined by dividing the rotation speed of the front-wheel motor 21 by the gear ratio of the reducer 22. The clutch 23 is provided between the reducer 22 and the front wheel 20. The clutch 23 allows or prohibits the transmission of drive power between the front-wheel motor 21 and the front wheel 20. In this case, the state of the clutch 23 in which the transmission of drive power between the front-wheel motor 21 and the front wheel 20 is allowed is referred to as "connected state", and the state in which the transmission of drive power is prohibited is referred to as "disconnected state". The front-wheel motor 21, the reducer 22, and the clutch 23 are contained in the front wheel 20. In this respect, the front wheel 20 constitutes the so-called in-wheel motor.

The rear wheel 30 has a rear-wheel motor 31. The rear-wheel motor 31 is an AC motor such as a synchronous motor, similarly to the front-wheel motor 21. The rear-wheel motor 31 directly drives the rear wheel 30. Therefore, the rotation speed of the rear wheel 30 is equal to the rotation speed of the rear-wheel motor 31. Further, the rear-wheel motor 31 is contained in the rear wheel 30. In this respect, the rear wheel 30 constitutes an in-wheel motor of the so-called direct drive system. Since the rear-wheel motor 31 directly drives the rear wheel 30, it is larger in the body size than the combination of the front-wheel motor 21 and the reducer 22.

The inverter 42 converts the electric power stored in the battery 43 from a direct current (DC) current to a three-phase AC current and supplies the converted power to the front-wheel motor 21 and the rear-wheel motor 31. The inverter 42 can change individually the supply mode of the electric power to the front-wheel motor 21 and the rear-wheel motor 31.

An electronic control unit (ECU) 41 is electrically connected to the clutch 23 and the inverter 42. The ECU 41 transmits a control signal to the clutch 23 and the inverter 42 and controls the operation of the clutch 23 and the inverter 42. Thus, the ECU 41 performs switching control of the connected state and disconnected state of the clutch 23. The ECU 41 also performs variable control of the rotation speed and torque of the front-wheel motor 21 and the rear-wheel motor 31 through the inverter 42.

Figure 2A:
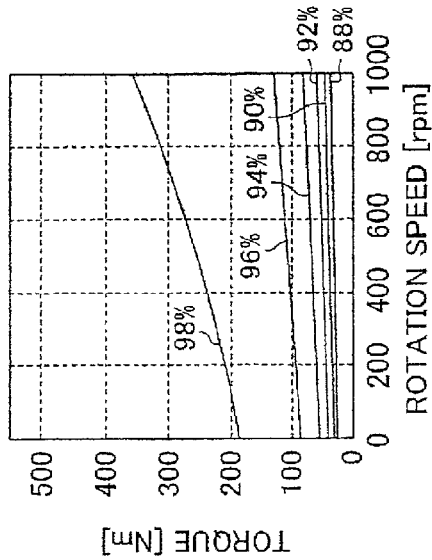
FIG. 2A is a graph showing the individual efficiency of a front-wheel motor.
Figure 2C:
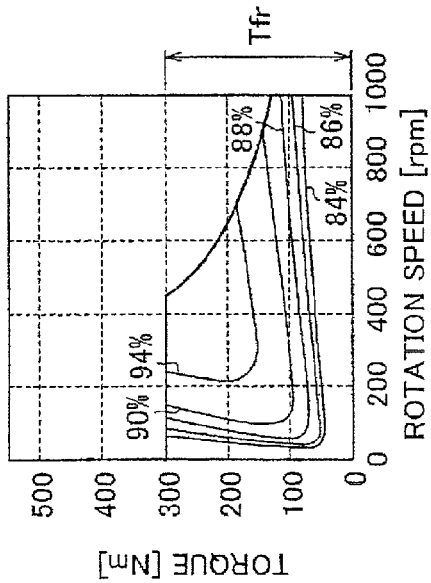
FIG. 2C is a graph showing the individual efficiency of a reducer.
Figure 2B:
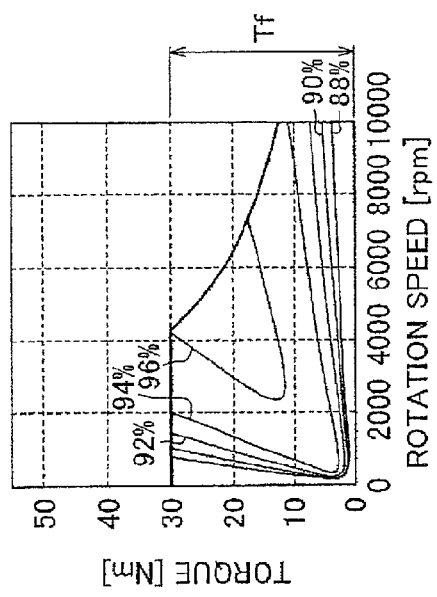
FIG. 2B is a graph showing the individual efficiency of a rear-wheel motor.

Characteristics of the front-wheel motor 21 and the rear-wheel motor 31 are explained below. As shown in FIGS. 2A and 2B, the front-wheel motor 21 is of a high-rotation and low-torque type as compared with the rear-wheel motor 31. Therefore, in the front-wheel motor 21, the loss caused by iron loss is higher and the loss caused by copper loss is lower than those in the rear-wheel motor 31. The "high-rotation and low-torque type" as referred to herein means that the no-load rotation speed of the front-wheel motor 21 is higher than the no-load rotation speed of the rear-wheel motor 31, and the maximum torque Tf of the front-wheel motor 21 is lower than the maximum torque Tb of the rear-wheel motor 31.

Thus, as shown in FIG. 2A, the front-wheel motor 21 has a large loss in a high-rotation region (for example, 7000 rpm to 10,000 rpm) and a low-torque region (for example, 0 Nm to 10 N·m) of the motor. Further, the front-wheel motor 21 has a small loss in a low-rotation region (for example, 1500 rpm to 5000 rpm) and a high-torque region (for example, 20 N·m to 30 N·m) of the motor. Therefore, the front-wheel motor 21 has a high-efficiency region in the low-rotation region and high-torque region of the motor.

As shown in FIGS. 2A and 2B, the rear-wheel motor 31 is a motor of a low-rotation and high-torque type as compared with the front-wheel motor 21. Therefore, in the rear-wheel motor 31, the loss caused by iron loss is lower and the loss caused by copper loss is higher than those in the front-wheel motor 21. The "low-rotation and high-torque type" as referred to herein means that the no-load rotation speed of the rear-wheel motor 31 is lower than the no-load rotation speed of the front-wheel motor 21, and the maximum torque Tb of the rear-wheel motor 31 is higher than the maximum torque Tf of the front-wheel motor 21.

Thus, as shown in FIG. 2B, the rear-wheel motor 31 has a large loss in a low-rotation region (for example, 0 rpm to 500 rpm) and a high-torque region (for example, 150 N·m to 300 N·m) of the motor. Further, the rear-wheel motor 31 has a small loss in a high-rotation region (for example, 500 rpm to 1000 rpm) and a low-torque region (for example, 50 N·m to 150 N·m) of the motor. Therefore, the rear-wheel motor 31 has a high-efficiency region in the high-rotation region and low-torque region of the motor.

In the region with an efficiency equal to or lower than "88%" in FIG. 2A and the region with an efficiency equal to or lower than "88%" in FIG. 2B, the efficiency actually greatly changes in the direction of reduction; this is not shown in the figures to simplify the figures. The same is true for the region with an efficiency equal to or lower than "88%" in FIG. 2C and the region with an efficiency equal to or lower than "84%" in FIG. 2D, which are described hereinbelow.

Individual characteristics of the reducer 22 that reduces the rotation speed of the front-wheel motor 21 and combined characteristics of the front-wheel motor 21 and the reducer 22 are explained below. As shown in FIG. 2C, the individual efficiency of the reducer 22 weakly depends on the rotation speed and strongly depends on the torque. The efficiency is higher when the torque is high than when the torque is low because a constant brake drag torque is generated, regardless of the rotation speed, inside the reducer 22. Thus, because of this constant brake drag torque, the ratio of the brake drag torque to the input torque inputted to the reducer 22 increases with the decrease in torque, and the efficiency decreases. This is why the reducer 22 has a high-efficiency region in a high-torque region. The rotation speed plotted on the abscissa and the torque plotted on the ordinate in FIG. 2C are the rotation speed and torque after the reduction that are outputted from the reducer 22.

Figure 2D:
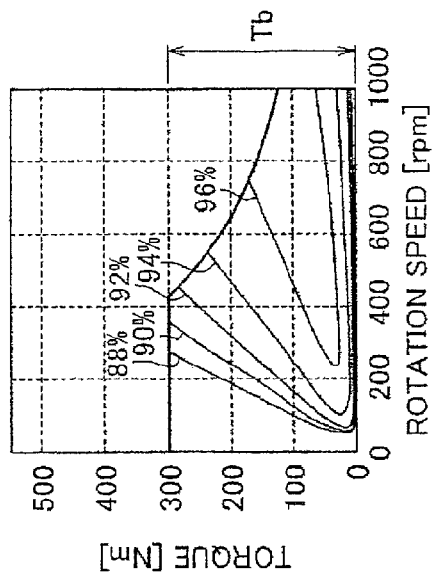
FIG. 2D is a graph showing the combined efficiency of the front-wheel motor and reducer.

The combined efficiency of the front-wheel motor 21 and the reducer 22 shown in FIG. 2D can be determined by multiplying the individual efficiency of the front-wheel motor 21 shown in FIG. 2A and the individual efficiency of the reducer 22 shown in FIG. 2C. In the present embodiment, the gear ratio of the reducer 22 (referred to hereinbelow as "reduction ratio RR") is taken as "10". Further, the combined characteristic of the front-wheel motor 21 and the reducer 22 is referred to hereinbelow as the characteristic of the front-wheel motor 21 after the reduction.

As shown in FIG. 2D, in the characteristic of the front-wheel motor 21 after the reduction, the rotation speed region is reduced to one tenth and the torque region becomes tenfold those in the individual characteristic of the front-wheel motor 21 shown in FIG. 2A due to the reduction ratio RR of the reducer 22. The efficiency of the front-wheel motor 21 after the reduction has a high-efficiency region in the low-rotation region and high-torque region similarly to the individual efficiency of the front-wheel motor 21. This is because the high-efficiency region (low-rotation region and high-torque region) in the individual efficiency of the front-wheel motor 21 overlaps the high-efficiency region (high-torque region) in the individual efficiency of the reducer 22.

Accordingly, the front-wheel motor 21 after the reduction and the rear-wheel motor 31 have the following characteristics. Thus, the rotation speed region of the front-wheel motor 21 after the reduction is the same rotation speed region (0 rpm to 1000 rpm), as compared with the rotation speed region of the rear-wheel motor 31. Further, the torque region of the front-wheel motor 21 after the reduction is the same torque region (0 N·m to 300 N·m), as compared with the torque region of the rear-wheel motor 31. Therefore, the front-wheel motor 21 after the reduction and the rear-wheel motor 31 have the same respective rotation region in which the motors can rotate and torque region in which the motors can output torque. In the present embodiment, the maximum speed of the vehicle 1 is assumed to be realized at a wheel rotation speed of "1000 rpm" for the front wheels 20 and rear wheels 30.

Further, the maximum torque Tb of the rear-wheel motor 31 shown in FIG. 2B and the maximum torque Tfr of the front-wheel motor 21 after the reduction shown in FIG. 2D are each "300 N·m". This is because in the present embodiment, the reduction ratio RR (10) of the reducer 22 is set such that the maximum torque Tf (30 N·m) of the front-wheel motor 21 becomes equal to the maximum torque Tb (300 N·m) of the rear-wheel motor 31. Thus, a value obtained by dividing the maximum torque Tb (300 N·m) of the rear-wheel motor 31 by the maximum torque Tf (30 N·m) of the front-wheel motor 21 is the reduction ratio RR (10) of the reducer 22 of the present embodiment.

The front-wheel motor 21 after the reduction has a low efficiency in the rotation speed region (for example, 500 rpm to 1000 rpm) and torque region (for example, 50 N·m to 150 N·m) corresponding to the high-efficiency region of the rear-wheel motor 31. Further, the rear-wheel motor 31 has a low efficiency in the rotation speed region (for example, 100 rpm to 500 rpm) and torque region (for example, 200 N·m to 300 N·m) corresponding to the high-efficiency region of the front-wheel motor 21 after the reduction. Therefore, there is a difference in the positions of high-efficiency regions at respective rotation speeds and torques between the front-wheel motor 21 after the reduction and the rear-wheel motor 31. In the present embodiment, the total torque at the required vehicle speed is distributed to the front-wheel motor 21 after the reduction and the rear-wheel motor 31, which have different efficiency characteristics, in order to increase the total efficiency of the power system of the vehicle 1.

The total efficiency of the power system can be also the energy efficiency of the vehicle 1. Further, the total efficiency of the power system can be determined by dividing the power transmitted to the wheels (front wheels 20 and rear wheels 30) by the power consumed by the battery 43. More specifically, the total efficiency of the power system can be defined by the following Eq. (1) to Eq. (3).

In the equations, "$N_{FR}$" stands for the wheel rotation speed of the front right wheel, "$N_{FL}$"—the wheel rotation speed of the front left wheel, "$N_{RR}$"—the wheel rotation speed of the rear right wheel, and "$N_{RL}$"—the wheel rotation speed of the rear left wheel. "$T_{FR}$" stands for the output torque of the front right wheel, "$T_{FL}$"—the output torque of the front left wheel, "$T_{RR}$"—the output torque of the rear right wheel, and "$T_{RL}$"—the output torque of the rear left wheel. Further, "$I_{BAT}$" stands for the battery output current, "$V_{BAT}$"—the battery output voltage, "$P_{BAT}$"—the battery power consumption, "$P_V$"—the vehicle drive power, and "$\eta_P$"—the total efficiency of the power system. The units of rotation speed and torque are "rpm" and "N·m", respectively. The units of the battery output current, battery output voltage, battery output power and vehicle drive power, and total efficiency are "ampere (A)", "volt (V)", "watt (W)", and "%", respectively.

$$P_V = \frac{2\pi}{60}(N_{FL} \cdot T_{FL} + N_{FR} \cdot T_{FR} + N_{RL} \cdot T_{RL} + N_{RR} \cdot T_{RR})$$

$$P_{BAT} = I_{BAT} \cdot V_{BAT}$$

$$\eta_P = \left|\frac{P_V}{P_{BAT}}\right|^{SIGN(P_{BAT})} \times 100$$

SIGN($P_{BAT}$) is a dimensionless value equal to "1" when the battery 43 consumes power and drives the motors 21 and 31 and to "−1" when the motors 21 and 31 are driven and the power is regenerated in the battery 43.

Figure 3A:
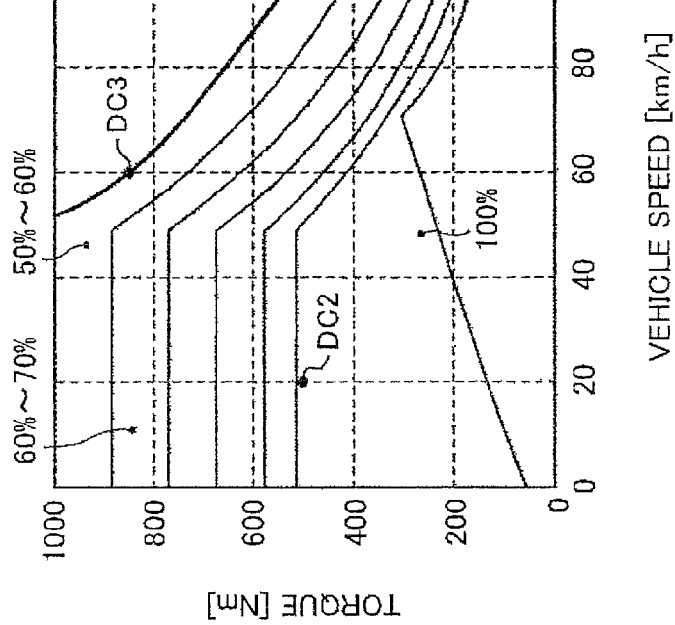
FIG. 3A is a graph showing the total efficiency of a power system.
Figure 3B:
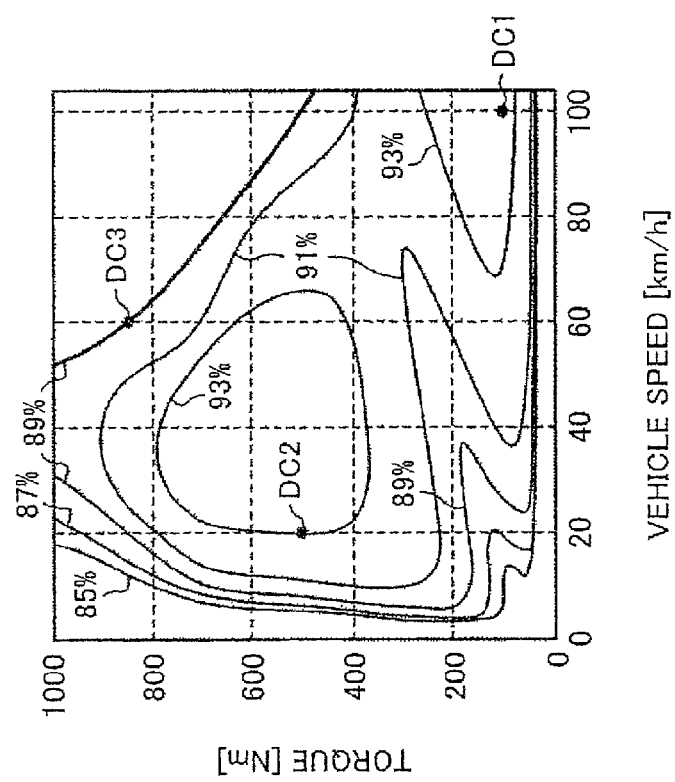
FIG. 3B is a graph showing a torque distribution ratio.

The total efficiency of the power system of the vehicle 1 is explained below with reference to FIGS. 3A and 3B. FIG. 3A is a graph illustrating the total efficiency of the power system related to the vehicle speed and total torque when the optimum torque distribution is performed. A wheel speed (=vehicle speed) corresponding to the wheel diameter and the rotation speed of the front-wheel motor 21 after the reduction and the rear-wheel motor 31 is plotted on the abscissa of the graph. The combined value of the torque outputted by the wheels (front wheels 20 and rear wheels 30) of four shafts of the vehicle 1 is plotted on the ordinate. FIG. 3B shows the distribution ratio of the torque outputted by the front-wheel motor 21 (front wheel 20) after the reduction and the rear-wheel motor 31 (rear wheel 30) when the total efficiency shown in FIG. 3A is obtained. The ratio shown in FIG. 3B indicates the distribution ratio for the torque of the front-wheel motor 21 after the reduction in the required torque. Thus, where the distribution ratio is "100%", it means that the required torque is outputted only by the front-wheel motor 21. Meanwhile, where the distribution ratio is "50%", it means that one half of the required torque is outputted by the front-wheel motor 21 after the reduction and the other half is outputted by the rear-wheel motor 31.

Thus, in the present embodiment the high-efficiency region of the front-wheel motor 21 after the reduction and the high-efficiency region of the rear-wheel motor 31 are positioned in respectively different rotation speed regions and torque regions. Therefore, the maximization of the total efficiency by torque distribution is facilitated by comparison with the case in which the aforementioned high-efficiency regions are positioned in respectively equal rotation speed regions and torque regions.

As shown in FIG. 3A, the total efficiency increases in the intermediate-speed region (20 km/h to 60 km/h) and intermediate-torque region (400 N·m to 800 N·m), and also in the high-speed region (70 km/h to 100 km/h) and low-torque region (100 N·m to 250 N·m). This is because in the intermediate-speed region and intermediate-torque region, the torque is mainly distributed to the front-wheel motor 21 after the reduction that has a high efficiency in the same regions, as shown in FIG. 3B, and in the high-speed region and low-torque region, the torque is mainly distributed to the rear-wheel motor 31 that has a high efficiency in the same regions, as shown in FIG. 3B.

Let us assume the case in which the wheel speed region corresponding to the rotation speed region of the front-wheel motor 21 after the reduction is "0 km/h to 50 km/h" and the wheel speed region corresponding to the rotation speed region of the rear-wheel motor 31 is "0 km/h to 150 km/h". In this case, the front wheels 20 can rotate at a maximum speed of "50 km/h", and the rear wheels 30 can rotate at a maximum speed of "150 km/h", but where the vehicle 1 runs at a speed equal to or higher than "50 km/h", only the rear-wheel motor 31 is driven. Therefore, where the rotation speed regions of the front-wheel motor 21 after the reduction and the rear-wheel motor 31 diverge from each other, as indicated hereinabove, the degree of freedom in torque distribution is decreased and the efficient torque distribution is difficult to perform. By contrast, in the present embodiment, the front-wheel motor 21 after the reduction and the rear-wheel motor 31 have about the same rotation speed region (0 rpm to 1000 rpm). Furthermore, the maximum rotation speed of the front-wheel motor 21 after the reduction and the rear-wheel motor 31 is the wheel rotation speed (1000 rpm) corresponding to the maximum speed of the vehicle 1. Therefore, since the vehicle 1 of the present embodiment does not have a speed range in which only any one wheel can rotate, the degree of freedom in torque distribution is high and the efficient torque distribution can be easily performed.

Further, where the torque region of the front-wheel motor 21 after the reduction is "0 N·m to 50 N·m" and the torque region of the rear-wheel motor 31 is "0 N·m to 500 N·m", a torque with a maximum of "100 N·m" can be outputted on the front wheel 20 side and a torque with a maximum of "1000 N·m" can be outputted at the rear wheel 30 side. Further, a torque with a maximum of "1100 N·m" can be outputted for the vehicle 1, but where a torque equal to or higher than "100 N·m" is required, the rear-wheel motor 31 is surely driven. Therefore, when the torque regions of the front-wheel motor 21 after the reduction and the rear-wheel motor 31, in particular the maximum torques Tfr and Tb, diverge from each other, as mentioned hereinabove, the degree of freedom in torque distribution is decreased and the efficient torque distribution is difficult to perform. By contrast, in the present embodiment, the front-wheel motor 21 after the reduction and the rear-wheel motor 31 have about the same torque region (0 N·m to 300 N·m), as can be deduced from FIGS. 2B and 2D. Furthermore, the maximum torques Tfr and Tb of the front-wheel motor 21 after the reduction and the rear-wheel motor 31 are about the same (300 N·m). Therefore, in the vehicle 1 of the present embodiment, the degree of freedom in torque distribution is high and the efficient torque distribution can be easily performed.

Thus, in the vehicle 1 of the present embodiment, the front-wheel motor 21 after the reduction and the rear-wheel motor 31 are set to have the same rotation speed characteristics and torque characteristics, but different efficiency characteristics with respect to the rotation speed and torque.

The operation of the vehicle 1 of the present embodiment is explained below. Initially, the torque distribution and total efficiency under the first driving condition DC1 at which the vehicle 1 runs at a high speed (100 km/h) and a low torque (100 N·m) is explained.

As shown in FIG. 3A, under the first driving condition DC1, the total efficiency is "equal to or higher than 93%". Further, as shown in FIG. 3B, under the first driving condition DC1, the total torque, from the torque (100 N·m) required for the vehicle 1, is distributed to the rear wheels 30. Therefore, the torque distributed to the front wheels 20 is "0 (zero)" and the front-wheel motor 21 is not driven.

However, under the first driving condition DC1, the reducer 22 and the front-wheel motor 21 are rotated through the front wheels 20 that are rotated by the running vehicle 1. In this case, part of the torque outputted by the rear-wheel motor 31 is consumed on rotating the front-wheel motor 21 and the reducer 22 and lost. Therefore, in the present embodiment, where the rear-wheel motor 31 is driven, but the front-wheel motor 21 is not driven, the torque is not transmitted to the front-wheel motor 21 and the reducer 22 through the front wheels 20 that are rotated by the running vehicle.

Figure 4A:
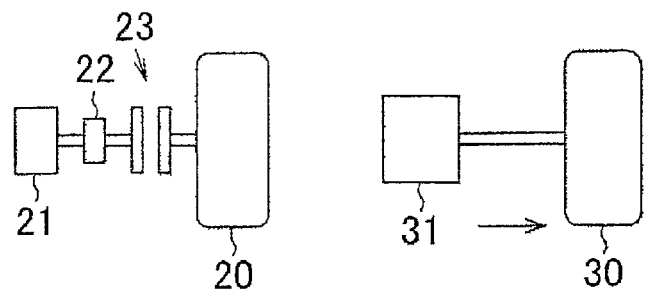
FIG. 4A is a schematic diagram showing the pattern of torque distribution corresponding to the driving conditions of the vehicle.

As shown in FIG. 4A, under the first driving conditions DC1, since the entire torque required for the vehicle 1 is distributed to the rear wheels 30, the clutch 23 disposed between the front wheel 20 and the reducer 22 is in the disconnected state. As a result, the clutch 23 prohibits the transmission of torque to the front-wheel motor 21 and the reducer 22 through the front wheel 20 rotated by the running vehicle. Thus, under the abovementioned condition, the front-wheel motor 21 and the reducer 22 are prevented from rotating and the occurrence of loss is inhibited. Actually, the rotation energy generated when the front-wheel motor 21 is rotated by the front wheel 20 can be regenerated, but where the transmission efficiency is taken into account, the total loss is less when the clutch 23 is disconnected.

The torque distribution and total efficiency under the second driving condition DC2 at which the vehicle 1 runs at a low speed (20 km/h) and an intermediate torque (500 N·m) are explained below. As shown in FIG. 3A, under the second driving condition DC2, the total efficiency is "93%". Further, as shown in FIG. 3B, under the second driving condition DC2, the total torque, from the torque (500 N·m) required for the vehicle 1, is distributed to the front wheels 20. Therefore, the torque distributed to the rear wheels 30 is "0 (zero)", and the rear-wheel motor 31 is not driven.

Under the second driving condition DC2, the rear-wheel motor 31 is rotated through the rear wheels 30 that are rotated by the running vehicle 1. However, since the rear wheels 30 are not provided with the reducers 22 and also the iron loss in the rear-wheel motor 31 is comparatively small and the brake drag torque is low, the loss generated by the rotation of the rear-wheel motor 31 is very small.

Figure 4B:
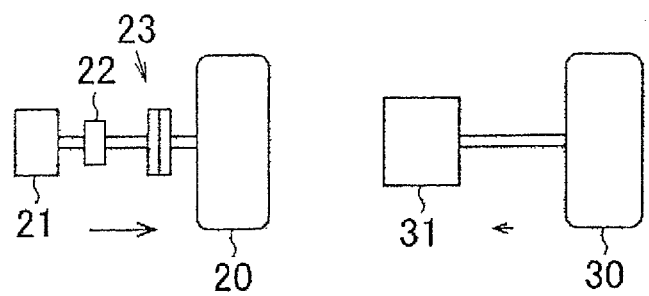
FIG. 4B is a schematic diagram showing the pattern of torque distribution corresponding to the driving conditions of the vehicle.

As shown in FIG. 4B, under the second driving condition DC2, the clutch of the front wheel 20 is set to the connected state to distribute the entire torque required for the vehicle 1 to the front wheels 20. Further, only the front-wheel motor 21 is driven. Meanwhile, the rear-wheel motor 31 is rotated by the rear wheels 30 rotated by the running vehicle. In this case, the rear-wheel motor 31 may perform regeneration by using the inputted rotation energy, as shown by an arrow in FIG. 4B.

The torque distribution and total efficiency under the third driving condition DC3 at which the vehicle 1 runs at a high speed (60 km/h) and a high torque (850 N·m) are described below. As shown in FIG. 3A, under the third driving condition DC3, the total efficiency is "89%". Further, as shown in FIG. 3B, under the third driving condition DC3, 50% (425 N·m) of the torque (850 N·m) required for the vehicle 1 is distributed to the front wheels 20, and 50% (425 N·m) of the torque is distributed to the rear wheels 30.

Figure 4C:
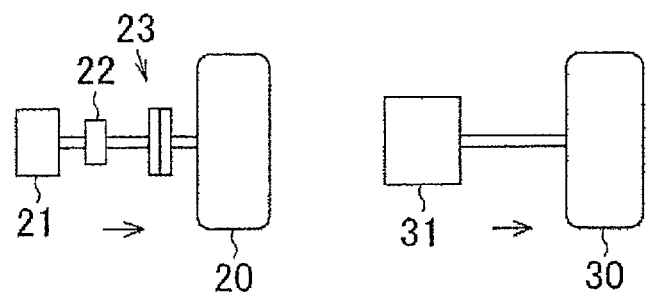
FIG. 4C is a schematic diagram showing the pattern of torque distribution corresponding to the driving conditions of the vehicle.

As shown in FIG. 4C, under the third driving conditions DC3, the clutches 23 of the front wheels 20 are set to the connected state in order to drive both the front-wheel motor 21 and the rear-wheel motor 31. Further, the front wheels 20 and the rear wheels 30 output an equal torque of "425 N·m".

Thus, in the present embodiment, the front-wheel motor 21 and the rear-wheel motor 31 with different positions of high-efficiency regions relating to the rotation speed and torque are controlled according to the driving conditions of the vehicle 1. Further, the total efficiency of the power system is maximized by changing the torque distribution ratio for the front wheels 20 (front-wheel motor 21 after the reduction) and rear wheels 30 (rear-wheel motor 31) according to the running conditions.

In the embodiment, torque (drive power) distribution is explained with respect to the case in which the vehicle 1 accelerates or runs at the same speed, but a similar explanation is applicable to braking power (regenerated power) distribution in the case where the vehicle 1 decelerates. Thus, the same approach can be also followed with respect to the front-wheel motor 21 and the rear-wheel motor 31 when determining the braking power distribution at which the regenerated energy can be maximized.

The effect of the vehicle 1 of the present embodiment is explained below. The front-wheel motor 21 after the reduction and the rear-wheel motor 31 have a difference in the efficiency characteristic relating to rotation speed and torque due to respective motor characteristics thereof. Therefore, the torque distribution that increases the total efficiency can be performed in the rotation speed region and torque region that are wider than those in the case of the direct drive system in which all of the wheels (front wheels 20 and rear wheels 30) are directly driven by the motors. Meanwhile, since the reducer 22 is not provided on the rear wheel 30 side, the efficiency on the rear wheel 30 side can be increased accordingly by comparison with the case where all of the wheels (front wheels 20 and rear wheels 30) are driven by the motors through the reducers. Therefore, in the vehicle 1 of the embodiment, the total efficiency of the power system driving the wheels can be increased under various driving conditions.

The torque region (0 N·m to 300 Mil) that can be generated by the front-wheel motor 21 after the reduction is the same as the torque region (0 N·m to 300 N·m) that can be generated by the rear-wheel motor 31. As a result, for example, it is possible to avoid the case in which the torque required for the vehicle 1 can be generated only by either one pair of wheels from among the front wheels 20 and rear wheels 30 driven by the motors 21 and 31, respectively.

Where the drive power is distributed only to the rear-wheel motor 31 when the vehicle is driven, the clutch 23 prohibits the transmission of drive power between the front-wheel motor 21 and the front wheels 20. As a result, the loss generated as a result of the drive power from the rear-wheel motor 31 rotating the front-wheel motor 21 through the front wheels 20 can be decreased.

The front-wheel motor 21 driving the front wheel 20 through the reducer 22 is less in size than the rear-wheel motor 31 driving the rear wheel 30. Therefore, the vehicle can be provided with a wider empty space in the radial direction of the motor in the front wheels 20, as compared with the case in which the front wheels 20 are driven by the direct drive system. As a result, the degree of freedom in the arrangement of the steering mechanism 10 on the front wheel 20 side can be increased.

The abovementioned embodiment may be also changed to the below-descried other embodiments. The reduction ratio RR of the reducer 22 may be set from the following Eq. (4) according to the maximum torque Tf of the front-wheel motor 21 and the maximum torque Tb of the rear-wheel motor 31. Here, "CT" is a positive constant; for example, it is preferred that a value thereof be taken within a range of "0.5 to 2.0".

$$RR = CT \cdot (Tb/Tf)$$

According to this equation, when the maximum torque Tf of the front-wheel motor 21 is "30 N·m" and the maximum torque Tb of the rear-wheel motor 31 is "300 N·m", it is preferred that the reduction ratio RR of the reducer 22 be "5 to 20". In such a case, the torque region of the front-wheel motor 21 after the reduction and the torque region of the rear-wheel motor 31 can be prevented from diverging from each other. In the equation above, other torque parameters of the motor, such as a rated torque and an initial torque, may be used instead of the maximum torques Tf and Tb.

The reduction ratio RR of the reducer 22 may be also set from the following Eq. (5) according to the no-load rotation speed (no-load speed) of the front-wheel motor 21 and the no-load rotation speed of the rear-wheel motor 31. The no-load rotation speed of the front-wheel motor 21 is denoted by "Nf" and the no-load rotation speed of the rear-wheel motor 31 is denoted by "Nb". Further, "CN" is a positive constant; for example, it is preferred that a value thereof be taken within a range of "0.5 to 2.0".

$$RR = CN \cdot (Nf/Nb)$$

According to this equation, where the no-load rotation speed Nf of the front-wheel motor 21 is "10000 rpm" and the no-load rotation speed Nb of the rear-wheel motor 31 is "1000 rpm", it is preferred that the reduction ratio RR of the reducer 22 be "5 to 20". In such a case, the rotation speed (speed) region of the front-wheel motor 21 after the reduction and the rotation speed region of the rear-wheel motor 31 can be prevented from diverging from each other. In the equation above, other rotation speed parameters of the motor, such as a rated rotation speed (rated speed) and an initial rotation speed (initial speed), may be used instead of the no-load rotation speed Nf and Nb.

The reduction ratio RR of the reducer 22 may be such that the reduction ratio RR satisfies either of Eq. (4) and Eq. (5). After implementing reduction, the maximum torque Tfr of the front-wheel motor 21 and the maximum torque Tb of the rear-wheel motor 31 are not necessarily equal to each other.

It is also possible to provide the reducer 22 in the rear wheel 30, without providing the reducer 22 in the front wheel 20. In this case, it is preferred that the rear-wheel motor 31 be a motor with a rotation speed higher or a torque lower than that of the front-wheel motor 21.

The clutch 23 may be provided between the rear-wheel motor 31 and the rear wheel 30. It is possible not to provide the clutch 23 between the front-wheel motor 21 and the front wheels 20. The front-wheel motor 21 and the rear-wheel motor 31 are not necessarily disposed in each of the front wheels 20 and the rear wheels 30.

It is also possible to drive the front wheels 20 with a single front-wheel motor 21 and to drive the rear wheels 30 with a single rear-wheel motor 31. The front-wheel motor 21 and the rear-wheel motor 31 may be other AC motors such as induction motors.

The characteristics relating to the rotation speed, torque, and efficiency of the front-wheel motor 21, reducer 22, and rear-wheel motor 31 are not limited to the numerical values in the abovementioned embodiment and may be freely changed. Technical concepts that can be grasped from the abovementioned embodiment and other embodiments are additionally described below.

In the vehicle, the reduction ratio of the reducer is preferably set correspondingly to a value obtained by dividing the no-load rotation speed of the aforementioned one motor by the no-load rotation speed of the other motor. With such a configuration, the rotation speed region in which the one motor reduced by the reducer can rotate can be prevented from diverging from the rotation speed region in which the other motor, which is not reduced by the reducer, can rotate. As a result, for example, it is possible to avoid the case in which the rotation speed (wheel speed) required for the vehicle can be generated only by the one motor reduced by the reducer or the other motor.

Figure 5:
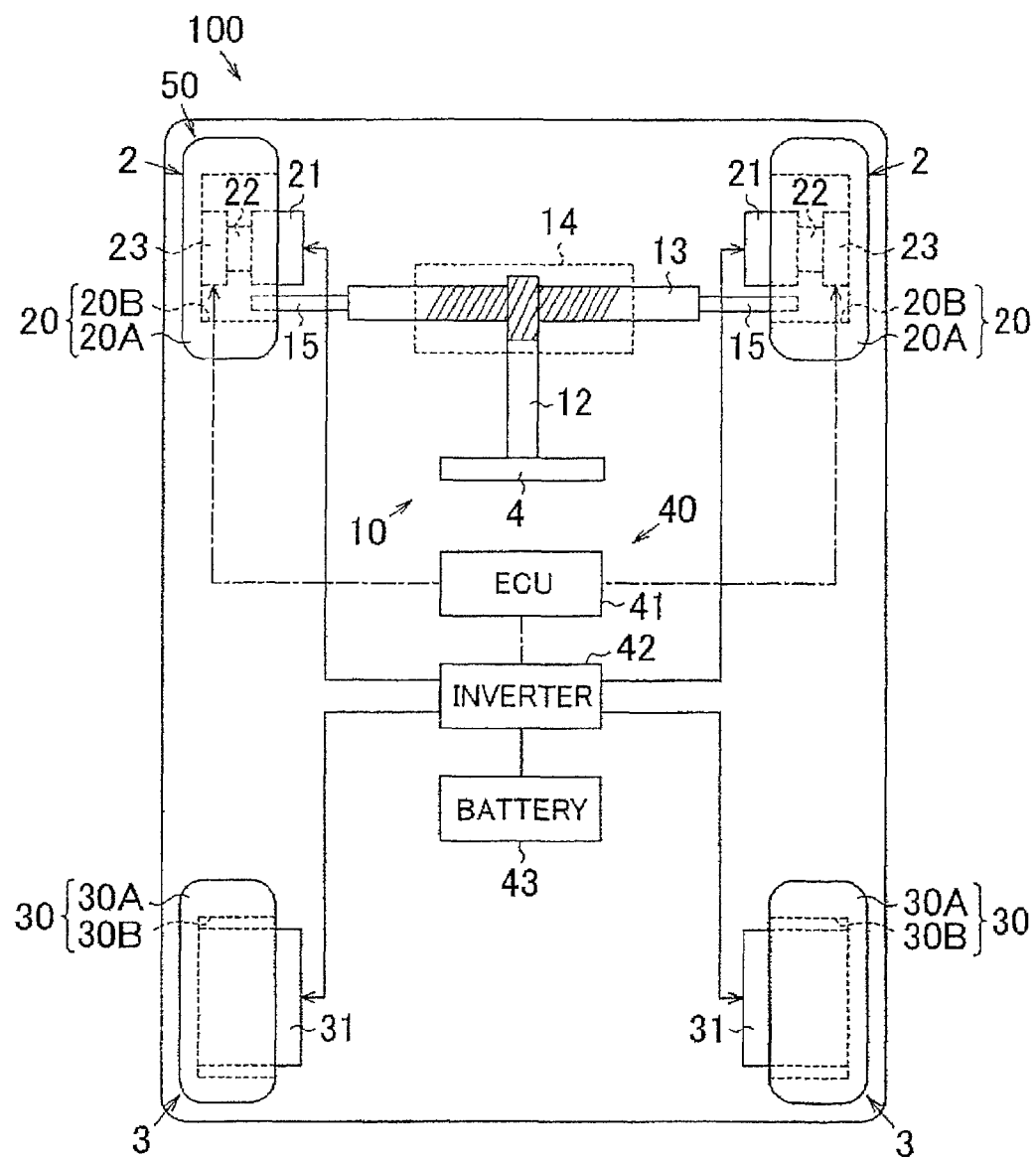
FIG. 5 is a schematic diagram of an electric vehicle equipped with the vehicle driving device of the embodiment.

The configuration of an electric vehicle 100 is explained below with reference to FIG. 5. The electric vehicle 100 has a pair of front wheels 20 as first wheels, a pair of rear wheels 30 as second wheels, a steering part 4, a vehicle driving device 50, and the battery 43. The electric vehicle 100 has a four-wheel drive system such that the vehicle is driven by the drive power of a set of front-wheel driving units 2 and a set of rear-wheel driving units 3 constituting the vehicle driving device 50. The front-wheel driving unit 2 is an example of the "first driving unit", and the rear-wheel driving units 3 is an example of the "second driving unit".

Each front wheel 20 has a tire 20A and a wheel 20B. Each rear wheel 30 has a tire 30A and a wheel 30B. The vehicle driving device 50 has a set of the front-wheel driving units 2, a set of the rear-wheel driving units 3, a control unit 40, and the steering mechanism 10. In the vehicle driving device 50, the front-wheel driving units 2 and the rear-wheel driving units 3 are controlled by the control unit 40.

The front-wheel driving unit 2 is contained in the wheel 20B of each front wheel 20. The front-wheel driving unit 2 has the front-wheel motor 21, the reducer 22, the clutch 23, and a hub unit (not shown in the figure). The front-wheel driving unit 2 has a configuration in which front-wheel motor 21 indirectly drives the front wheel 20 through the reducer 22, the clutch 23, and the hub unit. The front-wheel motor 21 is an example of the "first drive motor".

A three-phase brushless motor of an embedded magnet type is used as the front-wheel motor 21. The front-wheel motor 21 has a rotor including a permanent magnet, and a stator configured by winding a conductive wire on a stator core. The front-wheel motor 21 is coupled to the reducer 22.

The reducer 22 uses a planetary gear mechanism. The reducer 22 is mounted on the clutch 23. The reducer 22 transmits the torque of the front-wheel motor 21 to the wheel 20B through the clutch 23 in a state in which the rotation speed of the front-wheel motor 21 is reduced.

The clutch 23 is mounted on the wheel 20B, with the hub unit being interposed therebetween. The clutch 23 is switched between a connected state in which the torque of the front-wheel motor 21 (reducer 22) can be transmitted to the wheel 20B, and a disconnected state in which the torque of the front-wheel motor 21 (reducer 22) cannot be transmitted to the wheel 20B.

The rear-wheel driving unit 3 is contained in the wheel 30B of each rear wheel 30. The rear-wheel driving unit 3 has the rear-wheel motor 31 and a hub unit. The rear-wheel driving unit 3 is configured such that the rear-wheel motor 31 directly drives the rear wheel 30. The rear-wheel motor 31 is an example of the "second drive motor".

A three-phase brushless motor of an embedded magnet type is used as the rear-wheel motor 31. The rear-wheel motor 31 has a rotor including a permanent magnet and a stator configured by winding a conductive wire on a stator core. The body of the rear-wheel motor 31 is larger than the combined body of the front-wheel motor 21 and the reducer 22.

The control unit 40 has the ECU 41 and the inverter 42. The control unit 40 is electrically connected to the battery 43. Electric power from the battery 43 is supplied to the control unit 40.

The ECU 41 is electrically connected to the clutch 23 and the inverter 42. The ECU 41 transmits a control signal that controls the operation of the clutch 23 and the inverter 42 to the clutch 23 and the inverter 42. More specifically, the ECU 41 performs switching control of the connected state and disconnected state of the clutch 23 by a clutch control signal. The ECU 41 also performs variable control of the rotation speed and torque of the front-wheel motor 21 and the rear-wheel motor 31 by a motor control signal.

The inverter 42 converts the DC power of the battery 43 into three-phase AC power. The inverter 42 supplies the three-phase AC power to the front-wheel motors 21 and the rear-wheel motors 31. The inverter 42 can individually change the supply form of the electric power to the front-wheel motors 21 and the rear-wheel motors 31.

The steering mechanism 10 is connected to the front wheels 20. The steering mechanism 10 has the steering shaft 12, the rack shaft 13, the rack-and-pinion mechanism 14, and two tie rods 15. One end of the steering shaft 12 is connected to the steering part 4. The other end of the steering shaft 12 is connected to the rack shaft 13. Both ends of the rack shaft 13 are connected by the tie rods 15 to the front wheels 20. In the steering mechanism 10, the steering shaft 12 rotates integrally following the rotational operation of the steering part 4. In the steering mechanism 10, the rotation of the steering shaft 12 is converted into the reciprocating movement of the rack shaft 13 by the rack-and-pinion mechanism 14. In the steering mechanism 10, the steering angle of the front wheels 20 is changed through the tie rods 15 by the reciprocating movement of the rack shaft 13.

The characteristics of the front-wheel driving unit 2 and the rear-wheel driving unit 3 are explained below with reference to FIGS. 6A to 6D. In the explanation below that refers to FIGS. 6A to 6D, the constituent elements of the electric vehicle 100 that are assigned with reference numerals indicate the constituent elements described in FIG. 5. Further, the "motor efficiency" indicates the individual efficiency of the motors 21 and 31. The motor efficiency is calculated on the basis of the power supplied to the motors 21 and 31 and a product of the torque and rotation speed outputted by the motors 21 and 31.

Figure 6A:
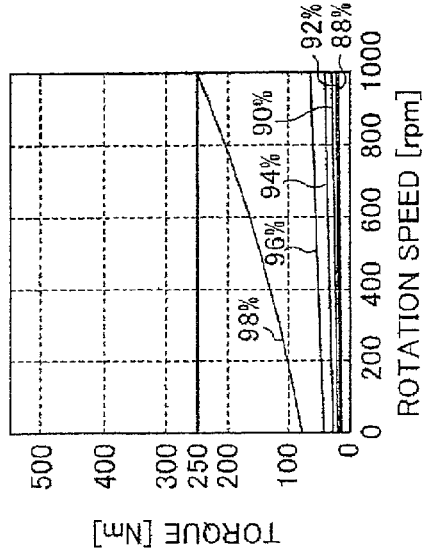
FIG. 6A is a graph showing the individual efficiency of a front-wheel drive motor, this graph relating to the vehicle driving device of the embodiment.
Figure 6C:
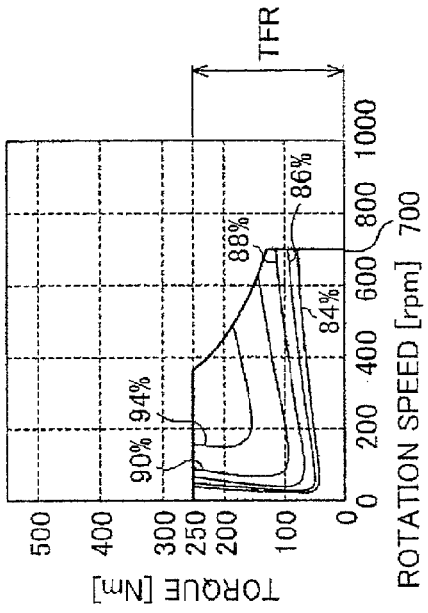
FIG. 6C is a graph showing the individual efficiency of a reducer, this graph relating to the vehicle driving device of the embodiment.
Figure 6B:
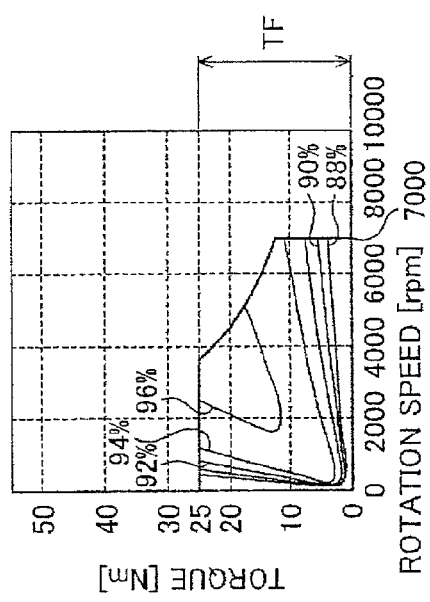
FIG. 6B is a graph showing the individual efficiency of a rear-wheel drive motor, this graph relating to the vehicle driving device of the embodiment.

In the region in FIG. 6A in which the motor efficiency is equal to or less than "88%" and in the region in FIG. 6B in which the motor efficiency is equal to or less than "84%", the motor efficiency actually changes significantly in the direction of decreasing (this is not shown in FIGS. 6A to 6D to simplify the drawings). The same is true for the region in FIG. 6C in which the motor efficiency is equal to or less than "88%" and the region in FIG. 6D in which the motor efficiency is equal to or less than "84%".

First, the motor characteristics of the front-wheel motor 21 and the rear-wheel motor 31 are explained with reference to FIGS. 6A and 6B. As shown in FIGS. 6A and 6B, the front-wheel motor 21 is configured as a motor with a rotation speed higher and a torque lower than those of the rear-wheel motor 31. Thus, the no-load rotation speed of the front-wheel motor 21 when the same voltage and current are supplied to the motors 21 and 31 is higher than the no-load rotation speed (intersection of broken lines in FIG. 6B) of the rear-wheel motor 31. The maximum torque TF of the front-wheel motor 21 when the same voltage and current are supplied to the motors 21 and 31 is less than the maximum torque TB of the rear-wheel motor 31. When the front-wheel motor 21 of the present embodiment is used to drive the electric vehicle 100, the upper limit of the rotation speed is set to "7000 rpm" and the maximum torque TF is set to "25 N·m".

Further, the front-wheel motor 21 is configured such that the loss caused by iron loss is larger and the loss caused by copper loss is lower than those in the rear-wheel motor 31. The iron loss in the front-wheel motor 21 of such a configuration is set to increase by increasing the amount of the permanent magnet, changing the arrangement of the permanent magnet, and increasing the voltage applied to the front-wheel motor 21. Further, in the front-wheel motor 21, the copper loss is set to decrease by decreasing the resistance of the conductive wire wound on the stator core and reducing the electric current supplied to the front-wheel motor 21.

As shown in FIG. 6A, in the front-wheel motor 21, the loss (iron loss) is large in a high-rotation region (for example, 5000 rpm to 7000 rpm) and a low-torque region (for example, 0 N·m to 5 N·m) of the front-wheel motor 21. Further, in the front-wheel motor 21, the loss (copper loss) is small in a low-rotation region (for example, 500 rpm to 3000 rpm) and a high-torque region (for example, 15 N·m to 25 N·m) of the front-wheel motor 21. Therefore, the front-wheel motor 21 has a high motor efficiency in the low-rotation region and high-torque region of the front-wheel motor 21.

As shown in FIGS. 6A and 6B, the rear-wheel motor 31 is configured as a motor with a rotation speed lower and a torque higher than those of the front-wheel motor 21. Thus, the no-load rotation speed of the rear-wheel motor 31 when the same voltage and current are supplied to the motors 21 and 31 is lower than the no-load rotation speed of the front-wheel motor 21. The maximum torque TB of the rear-wheel motor 31 when the same voltage and current are supplied to the motors 21 and 31 is larger than the maximum torque TF of the front-wheel motor 21. When the rear-wheel motor 31 of the present embodiment is used to drive the electric vehicle 100, the upper limit of the rotation speed is set to "1000 rpm" and the maximum torque TR is set to "250 N·m".

Further, the rear-wheel motor 31 is configured such that the loss caused by iron loss is lower and the loss caused by copper loss is higher than those in the front-wheel motor 21. In the rear-wheel motor 31 of such a configuration, the iron loss is set to decrease by decreasing the amount of the permanent magnet, changing the arrangement of the permanent magnet, and decreasing the voltage app lied to the rear-wheel motor 31. Furthermore, in the rear-wheel motor 31, the copper loss is set to increase by increasing the resistance of the conductive wire wound on the stator core and increasing the electric current supplied to the rear-wheel motor 31.

As shown in FIG. 6B, in the rear-wheel motor 31, the loss (copper loss) is large in a low-rotation region (for example, 0 rpm to 300 rpm) and a high-torque region (for example, 150 N·m to 250 N·m) of the rear-wheel motor 31. Further, in the rear-wheel motor 31, the loss (iron loss) is small in a high-rotation region (for example, 700 rpm to 1000 rpm) and a low-torque region (for example, 50 N·m to 100 N·m) of the rear-wheel motor 31. Therefore, the rear-wheel motor 31 has a high motor efficiency in the high-rotation region and low-torque region of the rear-wheel motor 31.

The individual characteristic of the reducer 22 and the combined characteristic of the front-wheel motor 21 and the reducer 22 are explained below with reference to FIGS. 6C and 6D. As shown in FIG. 6C, the individual efficiency of the reducer 22 has weak dependence on the rotation speed outputted by the reducer 22 and a strong dependence on the torque outputted by the reducer 22. The individual efficiency of the reducer 22 increases with the increase in the torque outputted by the reducer 22. The reason therefor is explained below. Thus, inside the reducer 22, a constant brake drag torque is generated regardless of the rotation speed outputted by the reducer 22. Therefore, the ratio of the brake drag torque to the torque outputted by the reducer 22 decreases with the increase in the torque outputted by the reducer 22. As a result, the individual efficiency of the reducer 22 increases with the increase in the torque outputted by the reducer 22. In the reducer 22 of the present embodiment, the reduction ratio RR is set to "10".

The combined characteristic of the front-wheel motor 21 and the reducer 22 shown in FIG. 6D (referred to hereinbelow as "characteristic of front-wheel motor 21 after the reduction") is calculated by multiplying the motor efficiency of the front-wheel motor 21 shown in FIG. 6A and the individual efficiency of the reducer 22 shown in FIG. 6C. In the characteristic of the front-wheel motor 21 after the reduction, the rotation speed region is reduced to one tenth and the torque region becomes tenfold those in the individual characteristic of the front-wheel motor 21 shown in FIG. 6A due to the reduction ratio RR. The efficiency of the front-wheel motor 21 after the reduction increases in the low-rotation region and high-torque region similarly to the individual efficiency of the front-wheel motor 21. This is because the high-efficiency region in the individual efficiency of the front-wheel motor 21 overlaps the high-efficiency region in the individual efficiency of the reducer 22.

Accordingly, the front-wheel motor 21 after the reduction and the rear-wheel motor have the following characteristics. Thus, the upper limit value (700 rpm) of the rotation speed region of the front-wheel motor 21 after the reduction is less than the upper limit value (1000 rpm) of the rotation speed region of the rear-wheel motor 31. Therefore, the upper limit value (700 rpm) of the wheel rotation speed of the wheel 20 driven by the front-wheel motor 21 is less than the upper limit value (1000 rpm) of the wheel rotation speed of the rear wheel 30 driven by the rear-wheel motor 31. The electric vehicle 100 of the present embodiment assumes the highest speed when the wheel rotation speed of the front wheels 20 and the rear wheels 30 is "1000 rpm". When the electric vehicle 100 has the highest speed, only the rear-wheel motor 31 is driven.

Figure 6D:
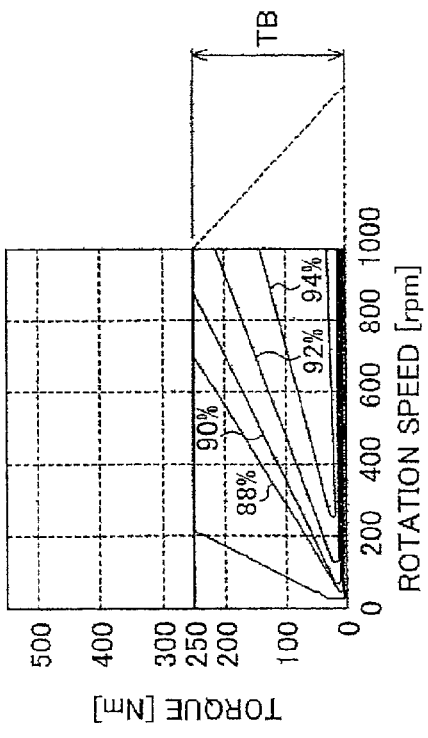
FIG. 6D is a graph showing the combined efficiency obtained by combining the individual efficiency of the front-wheel drive motor and the individual efficiency of the reducer, this graph relating to the vehicle driving device of the embodiment.

Further, the maximum torque TF of the front-wheel motor 21 after the reduction which is shown in FIG. 6D and the maximum torque TB of the rear-wheel motor 31 which is shown in FIG. 6D are each "250 N·m". Thus, the reduction ratio RR of the reducer 22 in the present embodiment is set such that the maximum torque TF (250 N·m) of the front-wheel motor 21 becomes equal to the maximum torque TB (250 N·m) of the rear-wheel motor 31. Thus, the reduction ratio RR of the reducer 22 in the present embodiment is calculated as a value obtained by dividing the maximum torque TB of the rear-wheel motor 31 by the maximum torque TF of the front-wheel motor 21.

The front-wheel motor 21 after the reduction cannot be used in the rotation speed region (700 rpm to 1000 rpm) corresponding to the region with a high motor efficiency of the rear-wheel motor 31. In addition, the front-wheel motor 21 after the reduction has a low efficiency in the rotation speed region (for example, 400 rpm to 700 rpm) and torque region (for example, 50 N·m to 150 N·m) corresponding to the region with a high motor efficiency region of the rear-wheel motor 31. Further, the rear-wheel motor 31 has a low efficiency in the rotation speed region (for example, 100 rpm to 300 rpm) and torque region (for example, 150 N·m to 250 N·m) corresponding to the region with a high motor efficiency in the front-wheel motor 21 after the reduction. Therefore, there is a difference in the positions of high-efficiency regions at respective rotation speeds and torques between the front-wheel motor 21 after the reduction and the rear-wheel motor 31.

The control unit 40 of the present embodiment distributes the total torque (total drive power) at the required running speed (vehicle speed) of the electric vehicle 100 to the front-wheel motor 21 after the reduction and the rear-wheel motor 31, which have different efficiency characteristics, in order to increase the total efficiency of the power system of the electric vehicle 100.

The total efficiency of the power system indicates the energy efficiency of the electric vehicle 100 (vehicle driving device 50). The total efficiency of the power system is calculated by dividing the power transmitted to the front wheels 20 and the rear wheels 30 by the power consumed by the battery 43. More specifically, the total efficiency of the power system is calculated by the following Eq. (6), Eq. (7), and Eq. (8).

$$P_V = \frac{2\pi}{60}(N_{FL} \cdot T_{FL} + N_{FR} \cdot T_{FR} + N_{RL} \cdot T_{RL} + N_{RR} \cdot T_{RR})$$

$$P_{BAT} = I_{BAT} \cdot V_{BAT}$$

$$\eta_P = \left|\frac{P_V}{P_{BAT}}\right|^{SIGN(P_{BAT})} \times 100$$

In the equations, "$N_{FR}$" stands for the wheel rotation speed of the front right wheel, "$N_{FL}$"—the wheel rotation speed of the front left wheel, "$N_{RR}$"—the wheel rotation speed of the rear right wheel, and "$N_{RL}$"—the wheel rotation speed of the rear left wheel. "$T_{FR}$" stands for the output torque of the front right wheel, "$T_{FL}$"—the output torque of the front left wheel, "$T_{RR}$"—the output torque of the rear right wheel, and "$T_{RL}$"—the output torque of the rear left wheel. Further, "$I_{BAT}$" stands for the output current of the battery 43, "$V_{BAT}$"—the output voltage of the battery 43, "$P_{BAT}$"—the power consumption of the battery 43, "$P_V$"—the vehicle drive power, and "$\eta_P$"—the total efficiency of the power system. $SIGN(P_{BAT})$ is a dimensionless value equal to "1" when the battery 43 consumes power and drives the front-wheel motors 21 and the rear-wheel motors 31 and $SIGN(P_{BAT})$ is a dimensionless value equal to "−1" when the electric power is regenerated from the front-wheel motors 21 and the rear-wheel motors 31 in the battery 43.

Figure 7A:
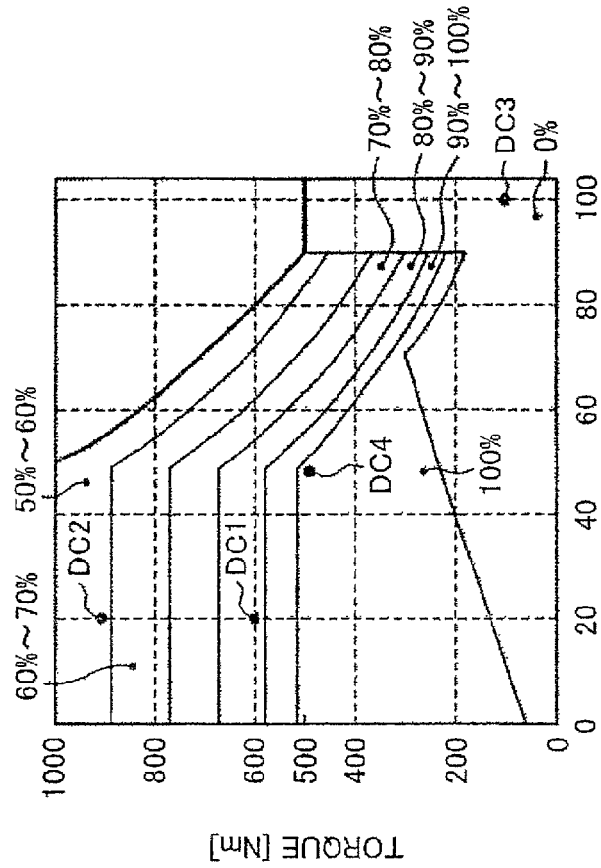
FIG. 7A is a graph showing the total efficiency of the power system, this graph relating to the vehicle driving device of the embodiment.

The total efficiency of the power system is explained below with reference to FIGS. 7A and 7B. The graph in FIG. 7A shows how the total efficiency of the power system depends on the vehicle speed and total torque when the optimum torque distribution of the total torque at the vehicle speed of the electric vehicle 100 is performed. A vehicle speed (km/h) calculated on the basis of the rotation speed of the front-wheel motor 21 after the reduction and the rear-wheel motor 31 and the diameter of the front wheels 20 and the rear wheels 30 is plotted on the abscissa of the graph shown in FIG. 7A. The total torque (N·m) calculated as a combined value of the torque outputted by the front wheels 20 and the rear wheels 30 is plotted on the ordinate of the graph shown in FIG. 7A.

Figure 7B:
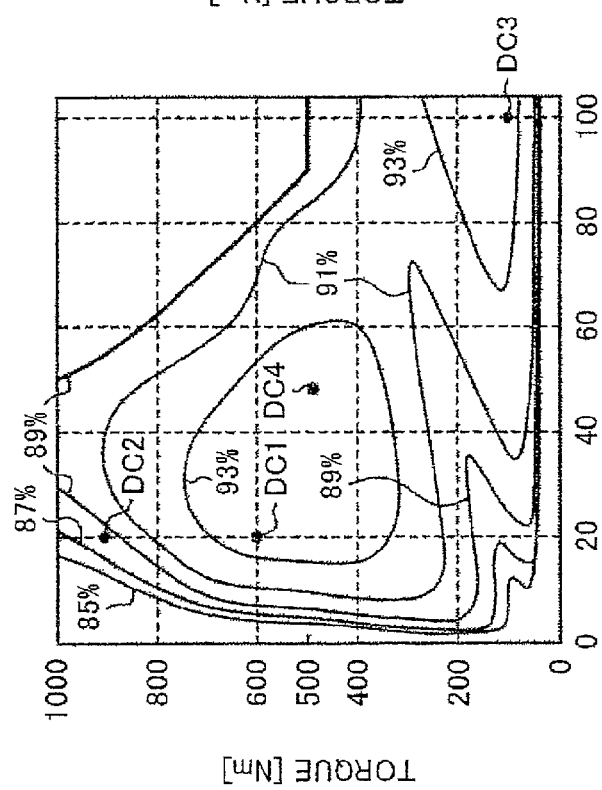
FIG. 7B is a graph showing the torque distribution ratio, this graph relating to the vehicle driving device of the embodiment.

The graph in FIG. 7B shows the distribution ratio of the torque outputted by the front-wheel motor 21 after the reduction and the rear-wheel motor 31 when the total efficiency of the power system shown in FIG. 7A is obtained. The distribution ratio shown in FIG. 7B indicates the ratio of the output torque of the front-wheel motor 21 after the reduction to the total torque required for the electric vehicle 100 (referred to hereinbelow as "required torque"). More specifically, when the distribution ratio is "100%", it means that the required torque is outputted only by the front-wheel motor 21 after the reduction. Where the distribution ratio is "50%", it means that one half of the required torque is outputted by the front-wheel motor 21 after the reduction and the other half is outputted by the rear-wheel motor 31. When the distribution ratio is "0%", the required torque is outputted only by the torque of the rear-wheel motor 31. The required torque is calculated, for example, on the basis of the depression amount of the accelerator pedal.

In the graph shown in FIG. 7B, the distribution ratio increases in the low-speed region to intermediate-speed region (10 km/h to 50 km/h) of the vehicle speed and in the intermediate-torque region (400 N·m to 800 N·m) of the total torque. Thus, in the low-speed region to intermediate-speed region and in the intermediate-torque region, the torque is mainly distributed to the front-wheel motor 21 after the reduction that has a high efficiency. Further, the distribution ratio decreases in the high-speed region (70 km/h to 100 km/h) of the vehicle speed and the low-torque region (100 N·m to 250 N·m) of the total torque. Thus, in the high-speed region and low-torque region, the torque is mainly distributed to the rear-wheel motor 31 that has a high efficiency.

Since the distribution ratio is set as shown in FIG. 7B, the total power efficiency increases in the low-speed region to intermediate-speed region (10 km/h to 50 km/h) of the vehicle speed and the intermediate-torque region (400 N·m to 800 N·m) of the total torque and also in the high-speed region (70 km/h to 100 km/h) of the vehicle speed and the low-torque region (100 N·m to 250 N·m) of the total torque, as shown in FIG. 7A.

The relationship between the driving state of the electric vehicle 100 and the total power efficiency is explained below with reference to FIGS. 7A to 9C. Examples of the driving states of the electric vehicle 100 include the first driving state DC1 to fourth driving state DC4 such as shown in FIG. 8. The first driving state DC1 is when the electric vehicle 100 is repeatedly stopped and started, as in the congested traffic or when the electric vehicle 100 is stopped and started at the traffic lights. The second driving state DC2 is when the electric vehicle 100 moves up on a steep hill. The third driving state DC3 is when the electric vehicle 100 is driven at a high speed on a highway. The fourth driving state DC4 is when the electric vehicle 100 is driven in an urban area.

In the first driving state DC1, the electric vehicle 100 is driven in the low-speed region of the vehicle speed and the intermediate-torque region of the total torque. In the second driving state DC2, the electric vehicle 100 is driven in the low-speed region of the vehicle speed and the high-torque region of the total torque. In the third driving state DC3, the electric vehicle 100 is driven in the high-speed region of the vehicle speed and the low-torque region of the total torque. In the fourth driving state DC4, the electric vehicle 100 is driven in the intermediate-speed region of the vehicle speed and the low-torque region of the total torque.

The torque distribution and total power efficiency in the case where the electric vehicle 100 is driven, for example, at a low speed (20 km/h) and an intermediate torque (600 N·m), as the first driving state DC1, are explained below. As shown in FIG. 7A, in the first driving state DC1, the total power efficiency is equal to or higher than "93%". As shown in FIG. 7B, in the first driving state DC1, the torque (540 N·m) constituting 90% of the required torque (600 N·m) is distributed to the front wheels 20, and the torque (60 N·m) constituting 10% is distributed to the rear wheels 30.

Figure 9A:
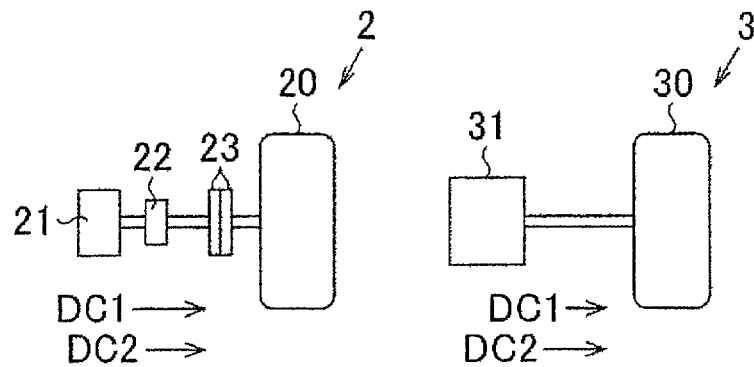
FIG. 9A is a plan view illustrating schematically the state of the front wheels and rear wheels corresponding to the running state of the electric vehicle of the embodiment.

As shown in FIG. 9A, in the first driving state DC1, both the front-wheel motor 21 and the rear-wheel motor 31 are driven. Therefore, the clutch 23 of the front-wheel driving unit 2 is in the connected state. The front wheels 20 output a torque of "540 N·m" and the rear wheels 30 output a torque of "60 N·m".

The torque distribution and total power efficiency in the case where the electric vehicle 100 is driven, for example, at a low speed (20 km/h) and a high torque (900 N·m), as the second driving state DC2, are explained below. As shown in FIG. 7A, in the second driving state DC2, the total power efficiency is equal to or higher than "87%" and lower than "89%". As shown in FIG. 7B, in the second driving state DC2, the torque (450 N·m) constituting 50% of the required torque (900 N·m) is distributed to the front wheels 20, and the torque (450 N·m) constituting 50% is distributed to the rear wheels 30.

In the second driving state DC2, similarly the first driving state DC1, both the front-wheel motor 21 and the rear-wheel motor 31 are driven. Therefore, the control unit 40 sets the clutch 23 of the front-wheel driving unit 2 to the connected state. The front wheels 20 and the rear wheels 30 output a torque of "450 N·m".

The torque distribution and total power efficiency in the case where the electric vehicle 100 is driven, for example, at a high speed (100 km/h) and a low torque (100 N·m), as the third driving state DC3, are explained below. As shown in FIG. 7A, in the third driving state DC3, the total power efficiency is equal to or higher than "93%". As shown in FIG. 7B, in the third driving state DC3, the entire required torque (100 N·m) is distributed to the rear wheels 30.

Figure 9B:
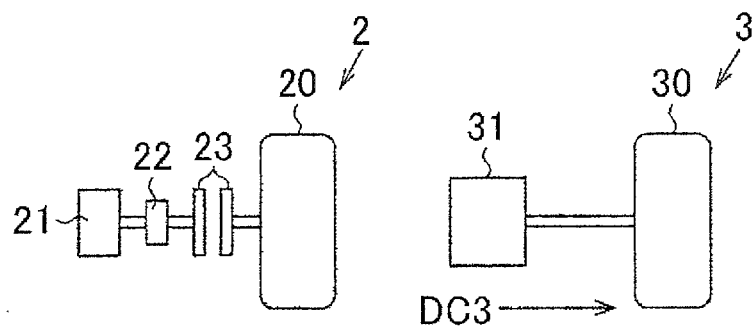
FIG. 9B is a plan view illustrating schematically the state of the front wheels and rear wheels corresponding to the running state of the electric vehicle of the embodiment.

As shown in FIG. 9B, in the third driving state DC3, only the rear-wheel motor 31 is driven. Therefore, the control unit 40 sets the clutch 23 of the front-wheel driving unit 2 to the disconnected state. As a result, the clutch 23 cuts off the transmission of torque to the front-wheel motor 21 and the reducer 22 through the front wheels 20 rotated by the rotation of the rear wheels 30. Thus, the clutch 23 inhibits the occurrence of loss caused by the rotation of the front-wheel motor 21 and the reducer 22 caused by the front wheels 20.

The torque distribution and total power efficiency in the case where the electric vehicle 100 is driven, for example, at an intermediate speed (50 km/h) and an intermediate torque (500 N·m), as the fourth driving state DC4, are explained below. As shown in FIG. 7A, in the fourth driving state DC4, the total power efficiency is equal to or higher than "93%". As shown in FIG. 7B, in the fourth driving state DC4, the entire required torque (500 N·m) is distributed to the front wheels 20.

Figure 9C:
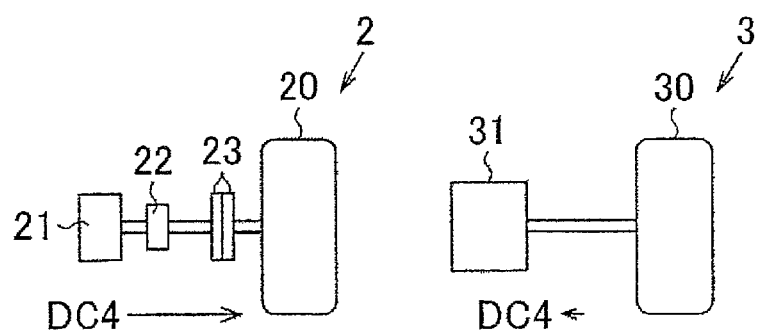
FIG. 9C is a plan view illustrating schematically the state of the front wheels and rear wheels corresponding to the running state of the electric vehicle of the embodiment.

As shown in FIG. 9C, in the fourth driving state DC4, only the front-wheel motor 21 is driven. Therefore, the control unit 40 sets the clutch 23 of the front-wheel driving unit 2 to the connected state. Meanwhile, the rear wheels 30 are rotated by the running electric vehicle 100. Therefore, the rear-wheel motor 31 is rotated by the rear wheels 30. In this case, the rear-wheel motor 31 performs regeneration by using the inputted rotation energy as shown by an arrow in FIG. 9C. Further, in the rear-wheel motor 31, the iron loss is lower than that in the front-wheel motor 21, and therefore the brake drag torque is also lower. In addition, the rear-wheel motor 31 is not coupled to the reducer. As a result, in the rear-wheel motor 31, the loss generated by the rotation of the rear-wheel motor 31 is less than the loss generated by the rotation of the front-wheel motor 21.

The operation of the vehicle driving device 50 of the present embodiment is explained below with reference to FIGS. 10A and 10B. In FIG. 10A, the graph of motor efficiency of a motor in which the upper limit value of the rotation speed of the front-wheel motor 21 is assumed to be 10000 rpm (referred to hereinbelow as "comparative motor") is shown as a comparative example by a broken line. In the front-wheel motor 21, the amount of permanent magnet is larger and the voltage applied is lower than those of the comparative motor. Further, in FIG. 10B, the graph of the total power efficiency of the vehicle driving device provided with a comparative motor (referred to hereinbelow as "comparative driving device") is shown by a broken line.

As shown in FIG. 10A, a line LE1 indicating the lower limit value of the rotation speed range of a region RE1 in which the motor efficiency of the front-wheel motor 21 of the present embodiment is equal to or higher than "96%" is positioned on the lower rotation speed side in relation to a line LAR1 indicating the lower limit value of the rotation speed range of a region RAR1 in which the motor efficiency of the comparative motor is equal to or higher than "96%". Therefore, as shown in FIG. 10B, a line LE2 indicating the lower limit value of the rotation speed range of a region RE2 in which the motor efficiency of the front-wheel motor 21 after the reduction is equal to or higher than "93%" is positioned on the lower rotation speed side in relation to a line LAR2 indicating the lower limit value of the rotation speed range of a region RAR2 in which the efficiency of the comparative motor is equal to or higher than "93%". The efficiency in the front-wheel motor 21 after the reduction is also positioned on the lower rotation speed side with respect to a motor efficiency of the front-wheel motor 21 of "94%" and "92%".

For example, where the electric vehicle 100 is driven at a low speed (20 km/h) and an intermediate torque (600 N·m), as the first driving state DC1, the total power efficiency of the comparative driving device is equal to or higher than "91%" and less than "93%", whereas the total power efficiency of the vehicle driving device 50 of the present embodiment is equal to or higher than "93%". Thus, in the vehicle driving device 50 of the present embodiment, the total power efficiency in a lower rotation speed region is increased over that in the comparative driving device. Therefore, in the vehicle driving device 50 of the present embodiment, a high total power efficiency can be provided over a wider rotation speed range than in the comparative driving device. As a result, the vehicle driving device 50 can have a high total power efficiency when the electric vehicle 100 is driven under traffic congestion conditions, in rural areas, and at a high speed on highways.

The vehicle driving device 50 of the present embodiment demonstrates the following effects. The front-wheel motor 21 is set such that the iron loss in the high-rotation region and high-torque region of the front-wheel motor 21 becomes large and the copper loss in the low-rotation region and high-torque region of the front-wheel motor 21 becomes small. The rear-wheel motor 31 is set such that the copper loss in the low-rotation region and high-torque region of the rear-wheel motor 31 becomes large and the iron loss in the high-rotation region and low-torque region of the rear-wheel motor 31 becomes small. In addition, the upper limit value of the wheel rotation speed of the front wheels 20 driven by the front-wheel motor 21 is less than the upper limit value of the wheel rotation speed of the rear wheels 30 driven by the rear-wheel motor 31.

With such a configuration, the motor efficiency of the front-wheel motor 21 in the low-rotation region and high-torque region of the front-wheel motor 21 increases. Further, the motor efficiency of the rear-wheel motor 31 in the high-rotation region and low-torque region of the rear-wheel motor 31 increases. In addition, the front-wheel motor 21 after the reduction has a higher efficiency in a lower rotation speed region than the configuration in which the upper limit value of the wheel rotation speed of the front wheels 20 driven by the front-wheel motor 21 is assumed to be equal to the upper limit value of the wheel rotation speed of the rear wheels 30 driven by the rear-wheel motor 31. Therefore, in the vehicle driving device 50, the total power efficiency increases in a lower rotation speed region.

Further, the front-wheel motor 21 after the reduction and the rear-wheel motor 31 differ in the position of a high-efficiency region related to the rotation speed and torque. As a result, the vehicle driving device 50 makes it possible to perform torque distribution that increases the total efficiency of the power system in a rotation speed region and torque region that are wider than the respective regions in the conventional vehicle driving device.

The front-wheel driving unit 2 has the front-wheel motor 21 and the reducer 22. The steering mechanism 10 is connected to the front wheels 20. With such a configuration, the maximum torque TF of the front-wheel motor 21 can be decreased by the reducer 22 with respect to that of the configuration in which the front-wheel motor is supposed to drive the front wheels directly (referred to hereinbelow as "virtual driving unit"). As a result, the front-wheel motor 21 can be reduced in body size with respect to the front-wheel motor of the virtual driving unit. Thus, an empty space formed between the front wheels 20 and the front-wheel motor 21 is larger than that in the virtual driving unit. Therefore, the degree of freedom in arranging the steering mechanism 10 with respect to the front wheels 20 when the steering mechanism 10 is mounted on the front wheels 20 is increased.

The front-wheel driving unit 2 has the clutch 23. When the entire torque of the required torque is distributed to the rear-wheel motor 31, the clutch 23 is in the disconnected state. With such a configuration, the occurrence of loss caused by the rotation of the front-wheel motor 21 by the torque of the rear-wheel motor 31 through the front wheels 20 can be inhibited.

The torque region (0 N·m to 250 N·m) of the front-wheel motor 21 after the reduction is set to be equal to the torque region (0 N·m to 250 N·m) of the rear-wheel motor 31. With such a configuration, it is possible to avoid the situation in which the required torque can be generated only by either of the front wheels 20 and rear wheels 30 driven by the motors 21 and 31.

The vehicle driving device and electric vehicle of the invention include embodiments other than the above-described embodiment. Variation examples of the above-described embodiment are presented below as other embodiments of the vehicle driving device and electric vehicle of the invention. The below-described variation examples can be also combined with each other.

The reduction ratio RR of the reducer 22 of the embodiment is set to "10". However, the setting of the reduction ratio RR is not limited to the contents shown by way of example in the above-described embodiment. For example, the reduction ratio RR of the reducer 22 of a variation example is set from the following Eq. (9) on the basis of the maximum torque TF of the front-wheel motor 21 and the maximum torque TB of the rear-wheel motor 31. Here, "CT" is a positive constant. For example, it is preferred that a value between "0.5" and "2.0" be used.

$$RR=CT\times(TB/TF)$$

According to the equation above, when the maximum torque TF of the front-wheel motor 21 is "25 N·m" and the maximum torque TB of the rear-wheel motor 31 is "250 N·m", the reduction ratio RR assumes a value between "5" and "20". Further, in the equation above, other torque parameters of the motors 21 and 31, such as a rated torque and an initial torque, may be used instead of the maximum torques TF and TB.

In the vehicle driving device 50 of the embodiment, the maximum torque TF of the front-wheel motor 21 and the maximum torque TB of the rear-wheel motor 31 can have mutually different values. A three-phase brushless motor of an embedded magnet type is used as the front-wheel motor 21 of the embodiment. However, the configuration of the front-wheel motor 21 is not limited to the contents disclosed by way of example in the embodiment. For example, a three-phase brushless motor of a surface magnet type can be used as the front-wheel motor 21 of a variation example. An AC motor of another configuration, such as an induction motor, can be used as the front-wheel motor 21 of another variation example. The same changes can be made with respect to the rear-wheel motor 31.

In the front-wheel driving unit 2 of the embodiment, the clutch 23 can be omitted. In the front-wheel driving unit 2 of the embodiment, the reducer 22 can be also omitted. In this case, the upper limit value of the wheel rotation speed of the front wheels 20 driven by the front-wheel motor 21 is set to a value that is less than the wheel rotation speed of the rear wheels 30 driven by the rear-wheel motor 31, such as "700 rpm".

The clutch 23 can be also added to the rear-wheel driving unit 3 of the embodiment. A reducer can be also added to the rear-wheel driving unit 3 of the embodiment. The reduction ratio of the reducer of the rear-wheel driving unit 3 is preferably less than the reduction ratio of the reducer 22.

The front-wheel driving unit 2 of the embodiment has a configuration in which each front-wheel motor 21 directly drives the respective front wheel 20. However, the configuration of the front-wheel driving unit 2 is not limited to the contents disclosed by way of example in the embodiment. For example, the front-wheel driving unit 2 of a variation example has a drive shaft connecting the front wheels 20 to each other, and a drive motor rotating the drive shaft. In the front-wheel driving unit 2 of the variation example, the motor rotates the drive shaft, thereby rotating the front wheels 20. The rear-wheel driving unit 3 can be changed in a similar manner.

The vehicle driving device 50 of the embodiment has a steering mechanism 10. However, the configuration of the vehicle driving device 50 is not limited to the contents disclosed by way of example in the embodiment. For example, the vehicle driving device 50 of a variation example does not have the steering mechanism 10. The electric vehicle 100 of a variation example has the steering mechanism 10.

The vehicle driving device 50 of the embodiment uses a motor of a high-rotation low-torque type as the front-wheel motor 21 and a motor of a low-rotation high-torque type as the rear-wheel motor 31. However, the motor characteristics of the motors 21 and 31 are not limited to the contents disclosed by way of example in the embodiment. For example, in the vehicle driving device 50 of a variation example, a motor of a low-rotation high torque is used as the front-wheel motor 21, and a motor of a high-rotation low-torque type is used as the rear-wheel motor 31. In the vehicle driving device 50 of a variation example, the reducer 22 and the clutch 23 are omitted from the front-wheel driving unit 2, and the reducer 22 and the clutch 23 are added to the rear-wheel driving unit 3.

In the vehicle driving device 50 of the embodiment, the graphs of the characteristics relating to the rotation, speed, torque, and motor efficiency of the front-wheel motor 21, the reducer 22, and the rear-wheel motor 31 are not limited to the graphs (see FIGS. 6A to 9C) presented in the embodiment. Thus, in the vehicle driving device, the graphs of the characteristics relating to the rotation speed, torque, and motor efficiency of the front-wheel motor 21 and the reducer 22 can be freely changed with consideration for providing the front-wheel motor 21 with the increased iron loss in the high-rotation region and low-torque region and decreased copper loss in the low-rotation region and high-torque region of the front-wheel motor 21. Further, in the vehicle driving device, the graphs of the characteristics relating to the rotation speed, torque, and motor efficiency of the rear-wheel motor 31 can be freely changed with consideration for providing the rear-wheel motor 31 with the increased copper loss in the low-rotation region and high-torque region and decreased iron loss in the high-rotation region and low-torque region of the rear-wheel motor 31.

What is claimed is:

1. A vehicle comprising:
a pair of front wheels;
a pair of rear wheels;
a pair of front-wheel motors, each one of the pair of front-wheel motors being configured to drive one of the pair of front wheels;
a pair of rear-wheel motors, each one of the pair of rear-wheel motors being configured to drive one of the pair of rear wheels; and
a pair of reducers configured to (i) reduce a rotation speed of one pair of the pair of front-wheel motors and the pair of rear-wheel motors, and (ii) transmit drive power to the pair of front wheels or the pair of rear wheels driven by said one pair of the pair of front-wheel motors and the pair of rear-wheel motors, wherein
a first pair of the pair of front-wheel motors and the pair of rear-wheel motors are motors with a rotation speed higher and torque lower than a second pair of the pair of front-wheel motors and the pair of rear-wheel motors.

2. The vehicle according to claim 1, wherein
a reduction ratio of the reducer is set according to a value obtained by dividing a maximum torque of the second pair of the pair of front the of front-motors and the pair of rear-motors by a maximum torque of the first pair of the pair of front-wheel motors and the pair of rear-wheel motors.

3. The vehicle according to claim 1, further comprising at least one clutch configured to allow or prohibit transmission of drive power between at least one motor of the first pair of the pair of front-wheel motors and the pair of rear-wheel motors and at least one wheel of the pair of front wheels or the pair of rear wheels driven by the at least one motor of the first pair of the pair of front-wheel motors and the pair of rear wheel motors.

4. The vehicle according to claim 1, further comprising a steering mechanism configured to change a traveling direction, wherein
the steering mechanism is provided on a front wheel side of the vehicle, and
the first pair of the air of front-wheel motors and the pair of rear-wheel motors is the pair of front-wheel motors, and the second pair of the pair of front-wheel motors and the pair of rear-wheel motors is the pair of rear-wheel motors.

5. A vehicle driving device comprising:
a first driving unit having a first drive motors driving a pair of first wheels; and
a second driving unit having a second pair of drive motors driving a pair of second wheels, wherein
the first pair of drive motors are set such that (i) an iron loss is larger than an iron loss of the second pair of drive motors in a high-rotation region and a low-torque region of the first pair of drive motors, and (ii) a copper loss is smaller than a copper loss of the second pair of drive motors in a low-rotation region and a high-torque region of the first pair of drive motor;
the second pair of drive motors are set such that (i) a copper loss is larger than a copper loss of the first pair of drive motors in a low-rotation region and a high-torque region of the second pair of drive motors, and an iron loss is smaller than an iron loss of the first pair of drive motors in a high-rotation region and a low-torque region of the second pair of drive motors; and
an upper limit value of a wheel rotation speed of the pair of first wheels driven by the pair of first drive motors is less than an upper limit value of a wheel rotation speed of the pair of second wheels driven by the pair of second drive motors.

6. The vehicle driving device according to claim 5, further comprising a pair of reducers configured to transmit a torque of the pair of first drive motors to the first pair of wheels in a state in which a rotation speed of the first pair of drive motors is reduced.

7. The vehicle driving device according to claim 6, wherein
the first pair of wheels are front wheels, the second pair of wheels are rear wheels,
the vehicle driving device further comprising:
a steering mechanism configured to change a steering angle of the pair of front wheels.

8. The vehicle driving device according to claim 5, wherein the first driving unit is provided with at least one clutch that switches between a connected state in which a torque of at least one motor of the first pair of drive motors can be transmitted to at least one wheel of the first pair of wheels, and a disconnected state in which the torque of the at least one motor of the first pair of drive motors cannot be transmitted to the at least one wheel of the first pair of wheels.

9. The vehicle driving device according to claim 8, wherein
when only the second pair of drive motors are driven, the clutch is in the disconnected state.

10. An electric vehicle comprising the vehicle driving device according to claim 5.

* * * * *